(12) United States Patent
Ogawa et al.

(10) Patent No.: US 9,388,725 B2
(45) Date of Patent: Jul. 12, 2016

(54) REDUCING AGENT TANK AND WORK VEHICLE

(71) Applicant: KOMATSU LTD., Tokyo (JP)

(72) Inventors: Satoshi Ogawa, Osaka (JP); Taisuke Kusaba, Hirakata (JP); Yasutaka Kuse, Hirakata (JP)

(73) Assignee: KOMATSU LTD., Tokyo (JP)

( * ) Notice: Subject to any disclaimer, the term of this patent is extended or adjusted under 35 U.S.C. 154(b) by 261 days.

(21) Appl. No.: 14/359,129

(22) PCT Filed: Jan. 8, 2014

(86) PCT No.: PCT/JP2014/050120
§ 371 (c)(1),
(2) Date: May 19, 2014

(87) PCT Pub. No.: WO2014/192318
PCT Pub. Date: Dec. 4, 2014

(65) Prior Publication Data
US 2015/0377112 A1    Dec. 31, 2015

(51) Int. Cl.
*F01N 3/00* (2006.01)
*F01N 3/28* (2006.01)
(Continued)

(52) U.S. Cl.
CPC ............ *F01N 3/2896* (2013.01); *F01N 3/2066* (2013.01); *B01D 53/90* (2013.01); *B01D 53/9431* (2013.01); *B01D 53/9477* (2013.01); *F01N 2610/02* (2013.01); *F01N 2610/10* (2013.01); *F01N 2610/107* (2013.01); *F01N 2610/14* (2013.01); *F01N 2610/1406* (2013.01); *Y02T 10/24* (2013.01)

(58) Field of Classification Search
CPC ............... B01D 53/90; B01D 53/9431; B01D 53/9477; F01N 2610/02; F01N 2610/14; F01N 2610/1406; F01N 3/2066; F01N 3/2896; F01N 2610/10; Y02T 10/24
See application file for complete search history.

(56) References Cited

U.S. PATENT DOCUMENTS

| | | | | |
|---|---|---|---|---|
| 822,382 | A | * 6/1906 | Murphy | .................... C12C 7/17 165/11.1 |
| 4,237,850 | A | * 12/1980 | Connor | ................. F28D 1/0213 123/557 |

(Continued)

FOREIGN PATENT DOCUMENTS

| | | |
|---|---|---|
| CN | 1938569 A | 3/2007 |
| CN | 1954135 A | 4/2007 |

(Continued)

*Primary Examiner* — Jesse Bogue
(74) *Attorney, Agent, or Firm* — Drinker Biddle & Reath LLP

(57) ABSTRACT

A reducing agent tank is provided which enables detachment of a top cover and a heat exchanger while maintaining a long path length of a heat exchanger in a reducing agent tank. A first pipeline and a second pipeline respectively have extension portions which extend from lower ends of a suspended portion along a bottom face toward a side face of a container main body, and rising portions which extend from leading ends of the extension portions along the side face toward an upper face of the container main body. A length of the extension portions along the bottom face is larger than a maximum inside length of an opening. The rising portions and a turning portion form a leading end bent portion, and a rising length of the leading end bent portion is smaller than a minimum inside length passing through a center of the opening.

16 Claims, 14 Drawing Sheets

(51) Int. Cl.
*F01N 3/20* (2006.01)
*B01D 53/90* (2006.01)
*B01D 53/94* (2006.01)

(56) References Cited

U.S. PATENT DOCUMENTS

| | | | | |
|---|---|---|---|---|
| 4,476,841 A * | 10/1984 | Duckworth | ............. | F02N 31/18 |
| | | | | 123/522 |
| 4,656,979 A * | 4/1987 | Hogenson | ............. | F02M 31/10 |
| | | | | 123/142.5 R |
| 4,726,346 A * | 2/1988 | Lucht | ............. | F02M 31/10 |
| | | | | 123/142.5 R |
| 4,964,376 A * | 10/1990 | Veach | ............. | F01M 5/007 |
| | | | | 123/142.5 R |
| 8,496,888 B2 * | 7/2013 | Osaku | ............. | F01N 3/08 |
| | | | | 123/490 |
| 2007/0059222 A1 | 3/2007 | Satou et al. | | |
| 2007/0075467 A1 | 4/2007 | Osaku et al. | | |
| 2007/0079599 A1 * | 4/2007 | Osaku | ............. | F01N 3/2066 |
| | | | | 60/283 |
| 2007/0157602 A1 * | 7/2007 | Gschwind | ............. | B60K 15/00 |
| | | | | 60/274 |
| 2007/0202019 A1 | 8/2007 | Nishina et al. | | |
| 2009/0038296 A1 * | 2/2009 | Fukuda | ............. | B60K 15/00 |
| | | | | 60/295 |
| 2009/0127265 A1 * | 5/2009 | Magnusson | ............. | F01N 3/2066 |
| | | | | 220/564 |
| 2010/0162690 A1 | 7/2010 | Hosaka et al. | | |
| 2011/0271754 A1 * | 11/2011 | Ross, Jr. | ............. | G01F 23/74 |
| | | | | 73/295 |
| 2013/0167622 A1 | 7/2013 | Frivik | | |
| 2014/0054392 A1 * | 2/2014 | Hao | ............. | F01N 3/2066 |
| | | | | 239/74 |
| 2014/0061333 A1 * | 3/2014 | Hao | ............. | F01N 3/2066 |
| | | | | 239/302 |

FOREIGN PATENT DOCUMENTS

| | | | |
|---|---|---|---|
| CN | 101052788 | A | 10/2007 |
| CN | 102713603 | A | 10/2012 |
| GB | 2476317 | A | 6/2011 |
| JP | 2005-083223 | A | 3/2005 |
| JP | 2005-337227 | A | 12/2005 |
| JP | 2006-125317 | A | 5/2006 |
| JP | 2009-299526 | A | 12/2009 |
| JP | 2010-071263 | A | 4/2010 |
| JP | 2010-216306 | A | 9/2010 |
| JP | 2011-137441 | A | 7/2011 |
| JP | 2011-241734 | A | 12/2011 |

* cited by examiner

REDUCING AGENT TANK AND WORK VEHICLE

TECHNICAL FIELD

The present invention relates to a reducing agent tank and a work vehicle.

BACKGROUND ART

Work vehicles such as a hydraulic excavator, a bulldozer, a wheel loader, and the like have an exhaust gas treatment device. For example, a diesel particulate filter device (DPF), a diesel oxidation catalyst device (DOC), a selective catalytic reduction device (SCR), and the like are available as exhaust gas treatment devices. Particularly, the selective catalytic reduction device reduces nitrogen oxide contained in an exhaust gas to purify the exhaust gas. A reducing agent used for this exhaust gas treatment is stored in a reducing agent tank.

When the reducing agent is frozen in the tank, the reducing agent cannot be supplied to the exhaust gas treatment device. Therefore, for the purpose of preventing freezing of the reducing agent in the reducing agent tank, the technique of arranging a heat exchanger in the reducing agent tank to heat the reducing agent has been proposed. For example, Japanese Patent Laying-Open No. 2011-137441 (PTD 1) discloses a reducing agent tank provided with a suction pipe for taking out a liquid reducing agent from a tank main body and provided with a medium pipe which is bent back to reverse in the vicinity of a suction opening of the suction pipe to allow a medium for heat exchange to circulate to the tank main body so that the frozen reducing agent is thawed in the vicinity of the suction opening.

CITATION LIST

Patent Document
PTD 1: Japanese Patent Laying-Open No. 2011-137441

SUMMARY OF INVENTION

Technical Problem

For the purpose of improving the heat transfer efficiency to a reducing agent, a heat exchanger preferably has a long path length in a reducing agent tank to increase a surface area. On the other hand, taking into consideration the maintenance, the heat exchanger is preferably supported by a top cover which closes an upper opening of the tank. In this case, when the heat exchanger is bent excessively in the tank, there is a possibility that the top cover and the heat exchanger cannot be detached.

The present invention was achieved in view of the problem described above, and its main object is to provide a reducing agent tank enabling detachment of a top cover and a heat exchanger while securing a long path length of the heat exchanger in the reducing agent tank.

Solution to Problem

The reducing agent tank of the present invention includes a container main body, a heat exchanger, and a top cover. The container main body stores a reducing agent. An opening is formed in an upper face of the container main body. A medium for heat exchange with the reducing agent flows in the heat exchanger. The top cover closes the opening of the container main body and supports the heat exchanger. The heat exchanger includes a first pipeline which guides a heat exchange medium into the container main body, a second pipeline which allows a heat exchange medium to flow out from the container main body, and a turning portion. The first pipeline and the second pipeline communicate with each other through the turning portion. Each of the first pipeline and the second pipeline has a suspended portion which extends from the top cover toward a bottom face of the container main body, an extension portion which extends from a lower end of the suspended portion along the bottom face toward a side face of the container main body, and a rising portion which extends from a leading end of the extension portion along the side face toward the upper face of the container main body. A length of the extension portion along the bottom face is larger than a maximum inside length of the opening. The rising portion of the first pipeline, the rising portion of the second pipeline, and the turning portion form a leading end bent portion of the heat exchanger. A rising length of the leading end bent portion along the side face is smaller than a minimum inside length passing through a center of the opening.

In the present description, the reducing agent and a precursor recursor of the reducing agent are collectively referred to as "reducing agent."

According to the reducing agent tank of the present invention, the extension portion extends to a position beyond the opening in a planar view. Therefore, a path length of the heat exchanger becomes long, so that a surface area of the heat exchanger increases. Since a heat transfer area from the heat exchanger to the reducing agent can be increased, a heat transfer efficiency to the reducing agent can be improved. Since the leading end bent portion is movable via the opening, the top cover and the heat exchanger can be detached integrally from the container main body, so that the heat exchanger can be readily drawn out from the container main body.

In the reducing agent tank described above, a shape of the leading end bent portion viewed from an extending direction of the extension portion is included in a planar shape of the opening. In such a manner, the leading end bent portion can pass through the opening more readily, so that the heat exchanger can be drawn out from the container main body more readily.

In the reducing agent tank described above, a circumscribed circle of a shape of the leading end bent portion viewed from an extending direction of the extension portion is included in a planar shape of the opening. In such a manner, the leading end bent portion can pass through the opening yet more readily, so that the heat exchanger can be drawn out from the container main body yet more readily.

In the reducing agent tank described above, a distance between the leading end bent portion and the side face is smaller than a length obtained by bisecting a minimum distance between an edge of the opening and the side face. In such a manner, an extension length of the extension portion of the heat exchanger along the bottom face becomes longer, so that a path length of the heat exchanger becomes longer. Thus, the heat transfer efficiency to the reducing agent can be more improved.

In the reducing agent tank described above, the opening is circular. In such a manner, sealing between the container main body and the top cover can be improved, so that formation of a gap between the upper face of the container main body and the top cover can be suppressed. Accordingly, a leakage of the reducing agent stored in the container main body can be prevented more securely.

In the reducing agent tank described above, the first pipeline and the second pipeline extend from the top cover to the turning portion while maintaining a sum of an outer diameter of the first pipeline, an outer diameter of the second pipeline, and a distance between the first pipeline and the second pipeline to be smaller than a minimum inside length passing through a center of the opening. In such a manner, the heat exchanger as a whole can be readily moved from inside to outside of the container main body via the opening.

A work vehicle according to the present invention includes an engine, an exhaust gas treatment device which performs treatment with a reductive reaction to an exhaust gas from the engine, any one of the reducing agent tanks described above, and a reducing agent injection device which injects the reducing agent sucked out from the reducing agent tank to the exhaust gas guided to the exhaust gas treatment device. Accordingly, a work vehicle can be provided which includes a reducing agent tank enabling detachment of a top cover and a heat exchanger while securing a long path length of the heat exchanger in the reducing agent tank.

Advantageous Effects of Invention

As described above, according to the present invention, the long path length of the heat exchanger in the reducing agent tank can be secured, and the top cover and the heat exchanger can be detached.

DESCRIPTION OF EMBODIMENT

Hereinafter, an embodiment will be described with reference to the drawings.

Firstly, a configuration of a hydraulic excavator will be described with reference to FIG. 1, as one example of work vehicles to which an idea of the present invention is applicable. It should be noted that the present invention is applicable to work vehicles such as a wheel loader, a bulldozer, and the like provided with an engine unit including an exhaust gas treatment unit.

Figure 1:
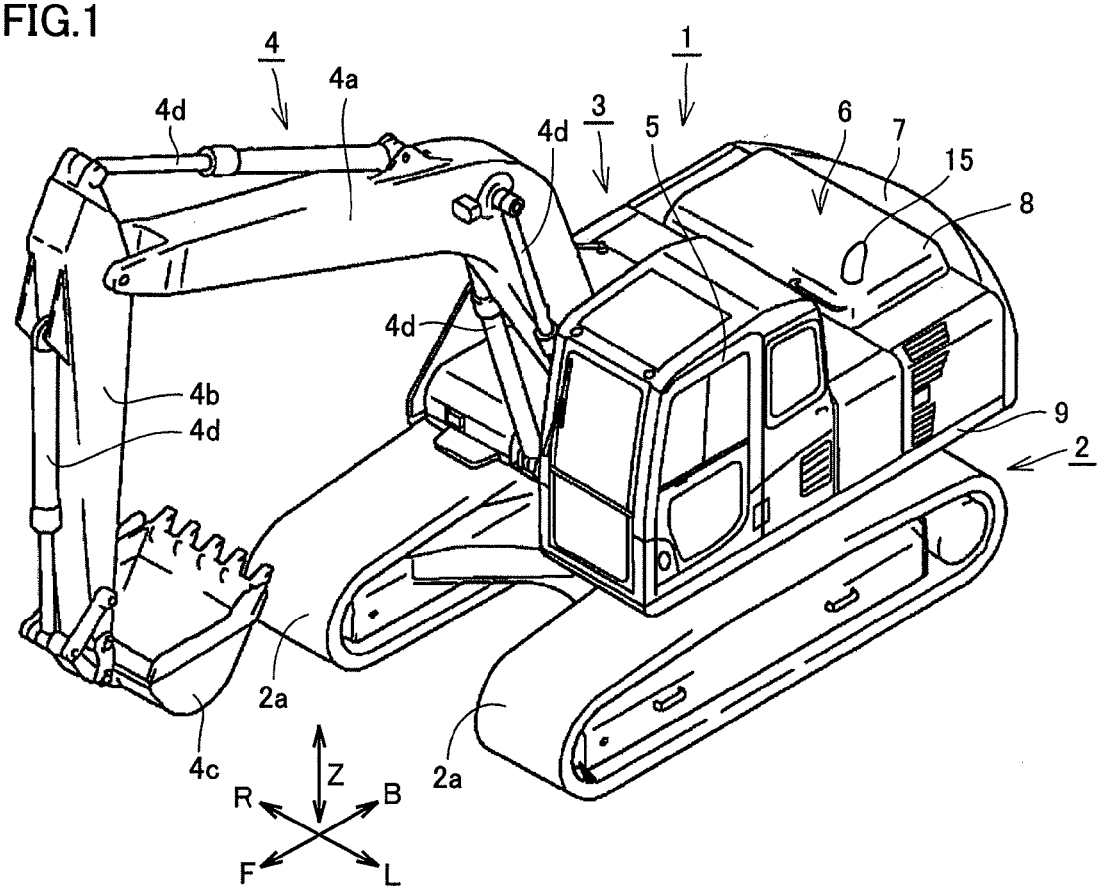
FIG. 1 is a perspective view schematically representing a configuration of a work vehicle according to one embodiment of the present invention.

FIG. 1 is a perspective view schematically representing a configuration of a hydraulic excavator 1 as a work vehicle according to one embodiment of the present invention. Referring to FIG. 1, hydraulic excavator 1 mainly includes an undercarriage 2, an upper revolving unit 3, and a work implement 4. Undercarriage 2 and upper revolving unit 3 constitute a work vehicle main body.

Undercarriage 2 includes a pair of left and right crawler belts 2a. Undercarriage 2 is configured to be self-propelled by rotation of the pair of crawler belts 2a. Upper revolving unit 3 is freely-revolvably mounted on undercarriage 2.

Upper revolving unit 3 has on a left side L in a front side F (vehicle front side) a cab 5 constituting a space for allowing an operator to operate hydraulic excavator 1. Upper revolving unit 3 has in a back side B (vehicle back side) an engine compartment 6 for accommodating an engine, and a counter weight 7. In the present embodiment, when in the state where an operator is seated in cab 5, a front side (front face side) of the operator is referred to as a front side F of upper revolving unit 3, and the opposite side therefrom, in other words, a back side of the operator is referred to as a back side of upper revolving unit 3. A left side of the operator in the seated state is referred to as a left side L of upper revolving unit 3, and a right side of the operator is referred to as a right side R of upper revolving unit 3. In the following, the front/back and left/right of upper revolving unit 3 are assumed to be matched with the front/back and left/right of a work vehicle. Further, upward and downward directions of the operator are denoted by the arrow Z in the drawings.

Upper revolving unit 3 has a revolving frame 9. Revolving frame 9 is included in a work vehicle main body. Revolving frame 9 is arranged above undercarriage 2 and provided to be freely revolvable with respect to undercarriage 2. Work implement 4, cab 5, and counter weight 7 are mounted on revolving frame 9 and arranged on an upper face of revolving frame 9. Hydraulic excavator 1 includes a revolving device, which is not illustrated in the drawings, for allowing upper revolving unit 3 to revolve relative to undercarriage 2. The revolving device is constituted of a revolving motor supported by undercarriage 2, gears supported by revolving frame 9, and the like.

Work implement 4 which performs operation such as excavating earth is pivotally supported by upper revolving unit 3 so as to be operable in upward and downward directions Z. Work implement 4 has a boom 4a attached to an approximately central portion in front side F of upper revolving unit 3 so as to be operable in upward and downward directions Z, an arm 4b attached to a leading end portion of boom 4a so as to be operable in forward and backward directions F, B, and a bucket 4c attached to a leading end portion of arm 4b so as to be operable in forward and backward directions F, B. Boom 4a, arm 4b, and bucket 4c are configured so as to be driven respectively by a hydraulic cylinder 4d.

Work implement 4 is provided on right side R relative to cab 5. Relative to cab 5 arranged on left side L in front side F of upper revolving unit 3, work implement 4 is provided on right side R of cab 5 which is one side of cab 5. The arrangement of cab 5 and work implement 4 is not limited to the example shown in FIG. 1. For example, work implement 4 may be provided on the left side of cab 5 which is arranged on the front right side of upper revolving unit 3.

Engine compartment 6 is provided above revolving frame 9 so as to be adjacent to front side F of counter weight 7. Revolving frame 9 forms a floor portion of engine compartment 6. Engine compartment 6 is covered with an engine hood 8 from an upper side. Engine hood 8 forms a ceiling portion of engine compartment 6. Counter weight 7 is arranged on back side B of engine compartment 6 and forms a wall of back side B of engine compartment 6. An exhaust stack 15 for discharging exhaust gas discharged from the engine to outside of hydraulic excavator 1 protrudes upward from engine hood 8.

Counter weight 7 is provided at a back end portion of revolving frame 9 to retain a vehicle balance of hydraulic excavator 1 during excavation and the like. Counter weight 7 is provided at back side B of engine compartment 6 on revolving frame 9. Counter weight 7 is formed, for example, by placing scrap iron and concrete in a box formed by assembling steel plates. The back face of counter weight 7 constitutes a surface of back side B of hydraulic excavator 1 and has a smoothly curved shape.

Figure 2:
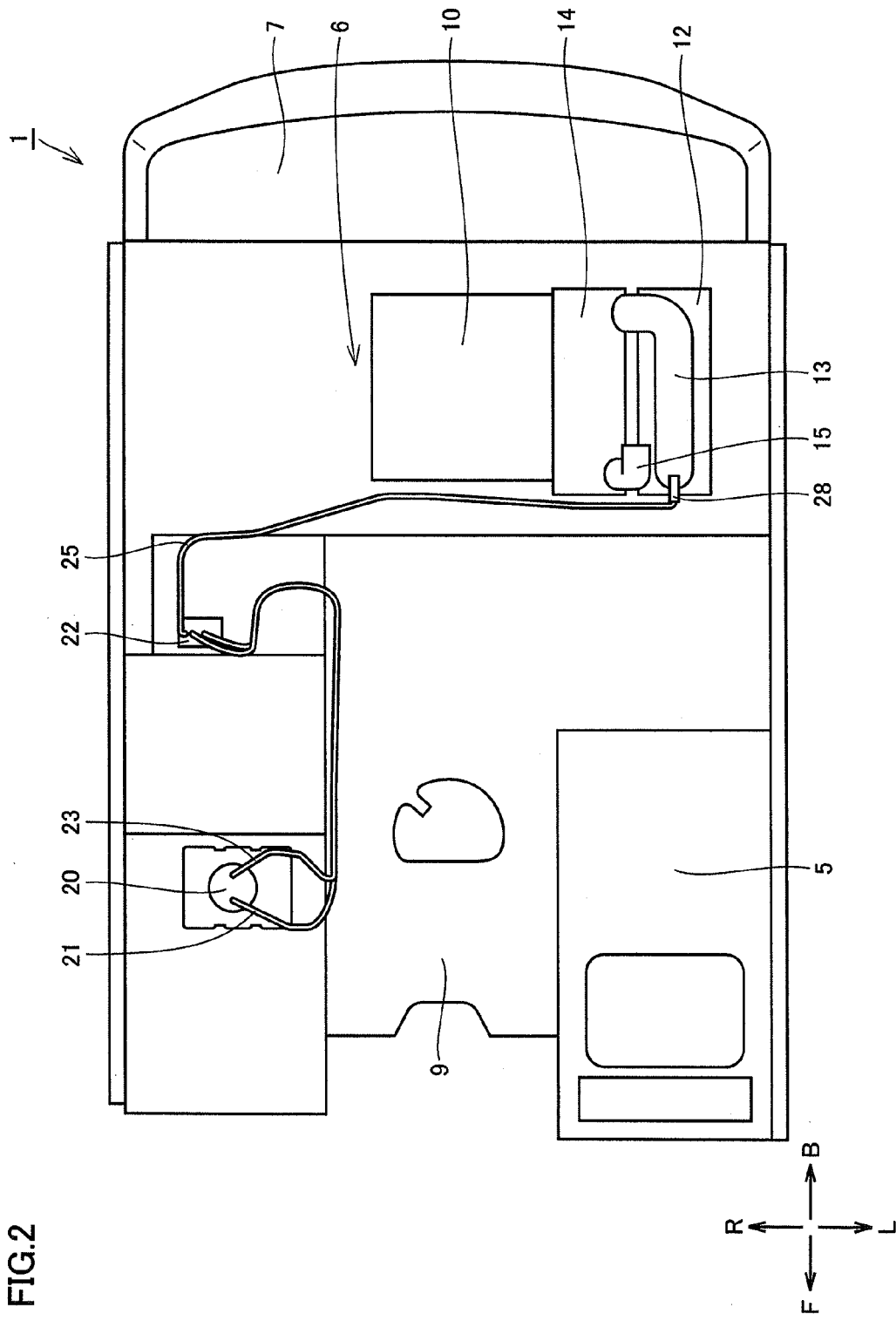
FIG. 2 is a plan view representing a path of a reducing agent pipe from a reducing agent tank to an exhaust gas treatment unit on a revolving frame in the work vehicle shown in FIG. 1.

Next, a path of a reducing agent pipe from a reducing agent tank to an exhaust gas treatment unit in the work vehicle of the present embodiment will be described with reference to FIG. 2. FIG. 2 is a plan view showing a path of the reducing agent pipe from the reducing agent tank to the exhaust gas treatment unit on revolving frame 9 in work vehicle (hydraulic excavator) 1 shown in FIG. 1. Referring to FIG. 2, hydraulic excavator 1 includes an engine 10 which is a power source for driving undercarriage 2 and work implement 4. Engine 10 is mounted on revolving frame 9. Engine 10 is mounted on revolving frame 9, particularly in a back portion of a center frame provided at a central location in the leftward and rightward directions. Engine 10 is accommodated in engine compartment 6.

Hydraulic excavator 1 includes in an engine compartment 6 an exhaust gas treatment unit for treating and purifying an exhaust gas discharged from engine 10. The exhaust gas treatment unit is arranged above engine 10 and mainly includes exhaust gas treatment devices 12, 14, an intermediate connection pipe 13, an exhaust stack 15, and an injection nozzle 28 for the reducing agent. Exhaust gas treatment device 12 is connected to engine 10 by an exhaust pipe 11 (FIG. 3) which will be described later. Exhaust gas treatment device 14 is connected to exhaust gas treatment device 12 by intermediate connection pipe 13. The exhaust gas discharged from engine 10 passes through exhaust gas treatment devices 12, 14 sequentially and is discharged to an atmosphere from exhaust stack 15. With respect to a flow of discharging of the exhaust gas from engine 10, exhaust gas treatment device 12 is arranged on a downstream side of engine 10, and exhaust gas treatment device 14 is arranged on a downstream side of exhaust gas treatment device 12.

Exhaust gas treatment device 12 collects particulates contained in the exhaust gas discharged from engine 10 to lower a concentration of particulates contained in the exhaust gas. Exhaust gas treatment device 12 is, for example, a diesel particulate filter device. Exhaust gas treatment device 14 reduces nitrogen oxide contained in the exhaust gas by a reaction with the reducing agent to cause a chemical change of nitrogen oxide into harmless nitrogen gas and lower the concentration nitrogen oxide contained in the exhaust gas. Exhaust gas treatment device 14 is, for example, an $NO_x$ removal device of a selective catalytic reduction type. Intermediate connection pipe 13 is provided with an injection nozzle 28 for injecting the reducing agent into intermediate connection pipe 13. Intermediate connection pipe 13 serves as a mixing pipe for injecting the reducing agent to the exhaust gas and mixing them.

Hydraulic excavator 1 further includes a reducing agent supply portion for supplying the reducing agent to the exhaust gas treatment unit. The reducing agent supply portion includes a reducing agent tank 20 and a reducing agent pump 22. Reducing agent tank 20 and reducing agent pump 22 are mounted on revolving frame 9, particularly on a side frame on right side R. Reducing agent pump 22 is arranged on front side F of engine compartment 6. Reducing agent tank 20 is arranged on front side F from reducing agent pump 22. Reducing agent tank 20 stores the reducing agent to be used in exhaust gas treatment device 14. For example, an aqueous urea solution is favorably used as the reducing agent. However, the reducing agent is not limited to this.

Reducing agent tank 20 and reducing agent pump 22 are coupled to one another by a feed pipe 21 and a return pipe 23. Feed pipe 21 is a pipe for feeding the reducing agent from reducing agent tank 20 to reducing agent pump 22. Return pipe 23 is a pipe for returning the reducing agent from reducing agent pump 22 to reducing agent tank 20. Reducing agent pump 22 and injection nozzle 28 are coupled to one another by a pressure feed pipe 25. Pressure feed pipe 25 is a pipe for transferring the reducing agent from reducing agent pump 22 to injection nozzle 28.

The reducing agent transferred from reducing agent tank 20 to reducing agent pump 22 via feed pipe 21 is branched off into two paths at reducing agent pump 22. The reducing agent which is not used for the exhaust gas treatment returns from reducing agent pump 22 to reducing agent tank 20 via return pipe 23. The reducing agent which is used for the exhaust gas treatment reaches injection nozzle 28 from reducing agent pump 22 via pressure feed pipe 25 and is sprayed from injection nozzle 28 into exhaust pipe 13.

The exhaust gas from engine 10 flows into exhaust gas treatment device 14 via intermediate connection pipe 13. Intermediate connection pipe 13 is provided on an upstream side of exhaust gas treatment device 14 in the flow of the exhaust gas. The reducing agent sucked out from reducing agent tank 20 is injected to the exhaust gas flowing in intermediate connection pipe 13 via injection nozzle 28 attached to intermediate connection pipe 13. The reducing agent is injected to an upstream side of exhaust gas treatment device 14 in a flow of the exhaust gas. The amount of the reducing agent injected to the exhaust gas is controlled based on temperature of the exhaust gas passing through exhaust gas treatment device 14 and on the concentration of nitrogen oxide contained in the exhaust gas.

Figure 3:
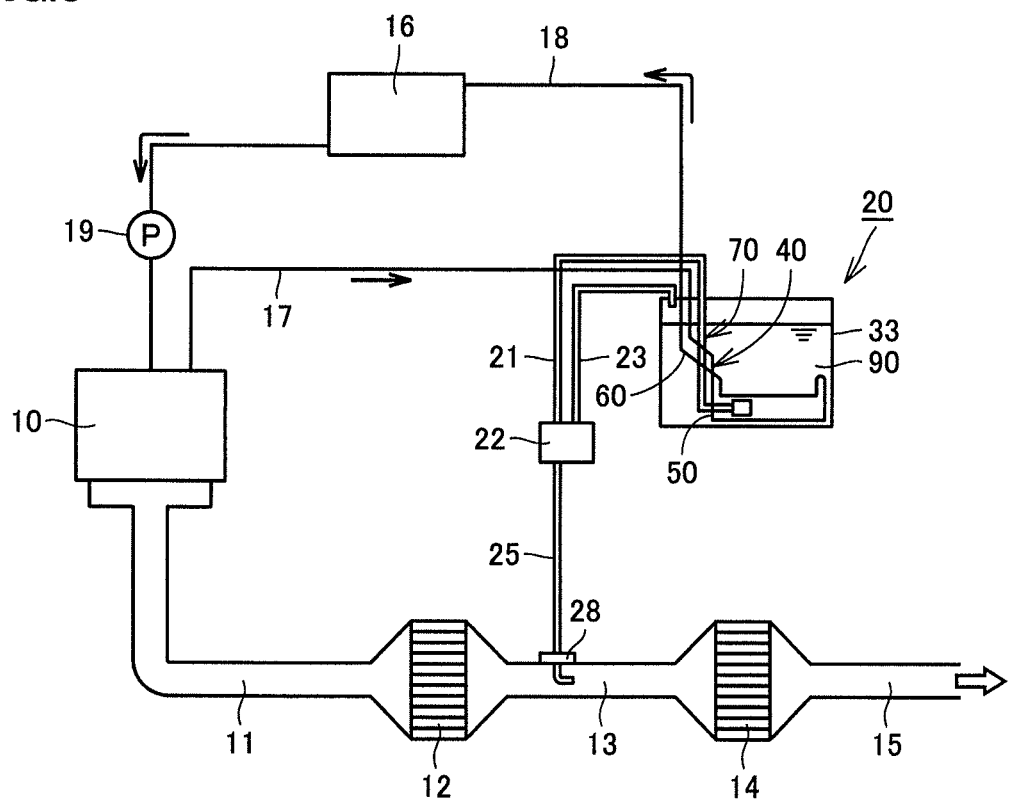
FIG. 3 is a functional diagram schematically representing a path of a reducing agent, a path of a medium for heat exchange, and an exhaust path of exhaust gas from an engine in the work vehicle shown in FIG. 1.

Next, a path of a medium for heat exchange and a path of the reducing agent in the work vehicle of the present embodiment will be described with reference to FIG. 3. FIG. 3 is a functional diagram schematically representing a path of the reducing agent, a path of the medium for heat exchange, and an exhaust path of the exhaust gas from the engine in the work vehicle of the present embodiment. As shown in FIG. 3, the exhaust gas discharged from engine 10 sequentially passes through exhaust pipe 11, exhaust gas treatment device 12, intermediate connection pipe 13, and exhaust gas treatment device 14, and then is discharged to outside of the vehicle from exhaust stack 15. Injection nozzle 28 is provided at intermediate connection pipe 13 on an upstream side of exhaust gas treatment device 14 in the flow of the exhaust gas.

Reducing agent tank 20 has a container main body 33 for storing a reducing agent 90. In container main body 33, a suction pipe 70 is arranged through which reducing agent 90 flowing out from reducing agent tank 20 flows. Suction pipe 70 is coupled to feed pipe 21. Reducing agent 90 sucked out from reducing agent tank 20 is transferred by reducing agent pump 22, passes through feed pipe 21 and pressure feed pipe 25 sequentially, and then reaches injection nozzle 28. Reducing agent 90 which is not used in the exhaust gas treatment returns from reducing agent pump 22 to reducing agent tank 20 via return pipe 23.

Injection nozzle 28 serves as a reducing agent injection device which injects reducing agent 90 sucked out from reducing agent tank 20 to an upstream side of the exhaust gas relative to exhaust gas treatment device 14. Injection nozzle 28 supplies reducing agent 90 to the exhaust gas which flows in exhaust pipe 13. In exhaust gas treatment device 14, nitrogen oxide contained in the exhaust gas reacts with reducing agent 90, so that the concentration of nitrogen oxide contained in the exhaust gas is reduced. When reducing agent 90 is an aqueous urea solution, the aqueous urea solution is dissolved and changed to ammonia in exhaust pipe 13, and nitrogen oxide is dissolved into harmless nitrogen and oxygen by a reaction between nitrogen oxide and ammonia. The exhaust gas with the amount of nitrogen oxide lowered to an appropriate value is discharged from exhaust stack 15.

In reducing agent tank 20, a heat exchanger 40 is arranged through which a medium (heat exchange medium) for heat exchange with reducing agent 90 flows. As the heat exchange medium, a cooling water for engine 10 is used. Heat exchanger 40 has a first pipeline 50 for guiding the heat exchange medium to reducing agent tank 20 and a second pipeline 60 for allowing the heat exchange medium to flow out from reducing agent tank 20. First pipeline 50 is coupled to a cooling water pipe 17. Second pipeline 60 is coupled to a cooling water pipe 18. Cooling water pipe 18 is provided with a radiator 16 and a cooling water pump 19.

Driving of cooling water pump 19 causes the cooling water of engine 10 to circulate through engine 10, heat exchanger 40, radiator 16, and cooling water pump 19. The cooling water heated in engine 10 undergoes heat exchange with reducing agent 90 at heat exchanger 40 so as to be cooled. On the other hand, reducing agent 90 receives heat from the cooling water so as to be heated. Radiator 16 is a heat exchanger for cooling the cooling water by performing heat exchange between the cooling water and air. The cooling water cooled in radiator 16 flows to a water jacket of engine 10, so that engine 10 is cooled appropriately.

Figure 4:
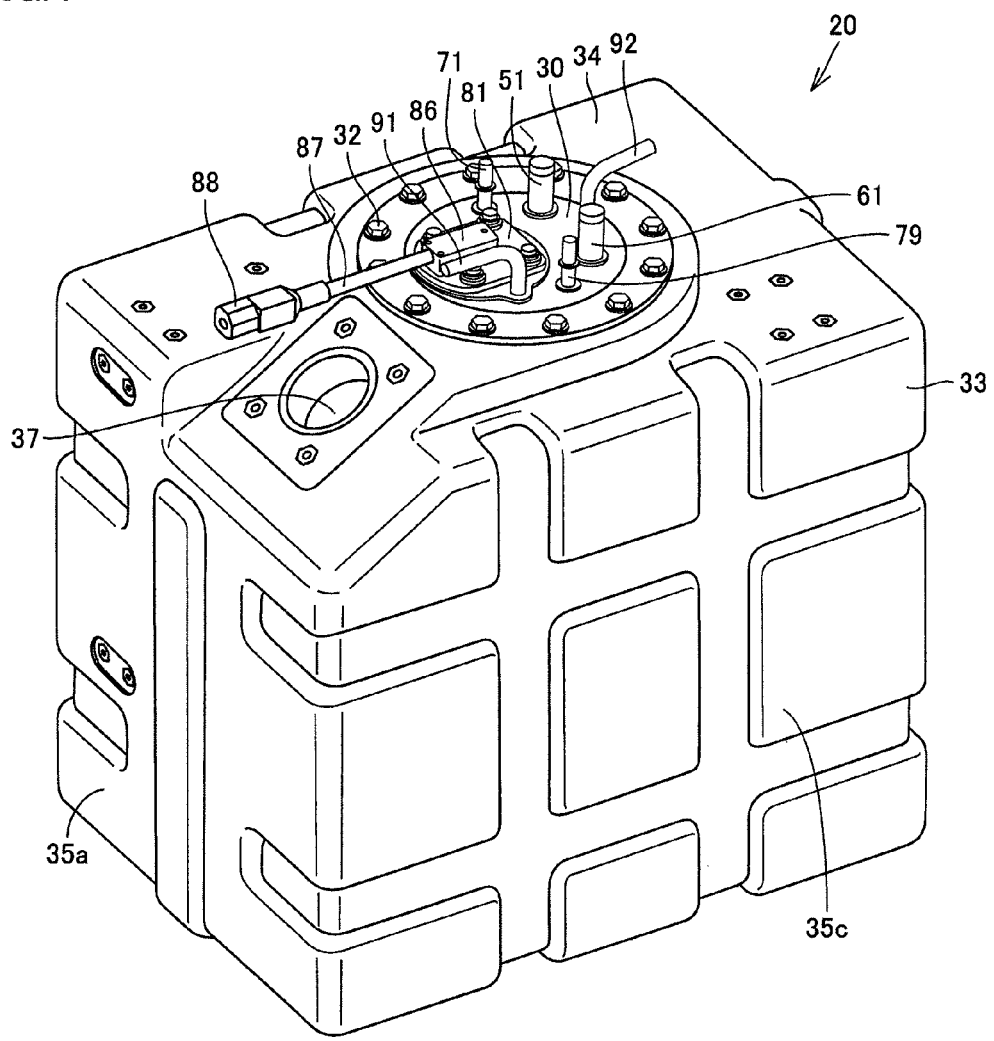
FIG. 4 is a perspective view schematically representing a configuration of the reducing agent tank.

In the following, a configuration of reducing agent tank 20 will be described in detail. FIG. 4 is a perspective view schematically representing a configuration of reducing agent tank 20 in the embodiment of the present invention. As shown in FIG. 4, reducing agent tank 20 has a hollow container main body 33. Container main body 33 has an approximately rectangular box-like outer shape. Container main body 33 is constituted of an upper face 34, side faces 35a, 35c, side faces 35b, 35d which are not illustrated in FIG. 4, and a bottom face 36 which is not illustrated in FIG. 4. Container main body 33 constitutes a space for storing the reducing agent between upper face 34 and bottom face 36. Container main body 33 is integrally formed by resin material such as polyethylene which is superior in corrosion resistance.

A replenishing port 37 for replenishing the reducing agent and an opening 31 (FIG. 6) which is not illustrated in FIG. 4 but described later are formed in upper face 34 of container main body 33. Opening 31 is closed by a disc-like top cover 30. In a periphery of opening 31, a plurality of bottomed bolt holes for fastening bolts 32 are formed. In an outer peripheral portion of top cover 30, a plurality of through holes penetrating through top cover 30 in a thickness direction are formed. Top cover 30 is detachably attached to container main body 33 by bolts 32 as fastening members. A sealing member such as an O-ring is formed between upper face 34 and top cover 30. Accordingly, opening 31 is sealed in a liquid-tight manner in the state where top cover 30 is fixed on upper face 34. Top cover 30 is formed of, for example, metal material which is superior in stiffness.

Penetrating portions 51, 61 are attached to top cover 30. Penetrating portions 51, 61 constitute a part of the heat exchanger which performs heat exchange with the reducing agent. A medium flowing into container main body 33 flows through penetrating portion 51. A medium flowing out from container main body 33 flows through penetrating portion 61.

An outflow port 71 which allows the reducing agent to flow out from container main body 33 and a return port 79 which allows the reducing agent to return to container main body 33 are attached to top cover 30. The end portion of feed pipe 21 shown in FIGS. 2 and 3 is coupled to outflow port 71. The end portion of return pipe 23 shown in FIGS. 2 and 3 is coupled to return port 79.

An attachment sheet 81 is detachably fastened to top cover 30 by bolts. Attachment sheet 81 supports a base portion 86 for a sensor which measures a level of the reducing agent, a concentration of the reducing agent, and a temperature of the reducing agent in container main body 33. A harness 87 is provided so as to protrude from base portion 86. A connector 88 is provided at a leading end of harness 87. Measured values of the level, concentration, and the temperature of the reducing agent are outputted to a controller, which is not illustrated in the drawings, via harness 87 and connector 88.

An air vent hole 91 and a breather 92 are attached to top cover 30. When the reducing agent is replenished from replenishing port 37 to container main body 33, air which is present in container main body 33 flows out of container main body 33 via air vent hole 91. Breather 92 is provided so as to automatically maintain a constant air pressure in container main body 33. When the air in container main body 33 expands or contracts due to a change in an ambient temperature, air is discharged or taken in via breather 92, so that a constant pressure in container main body 33 can be maintained.

Figure 5:
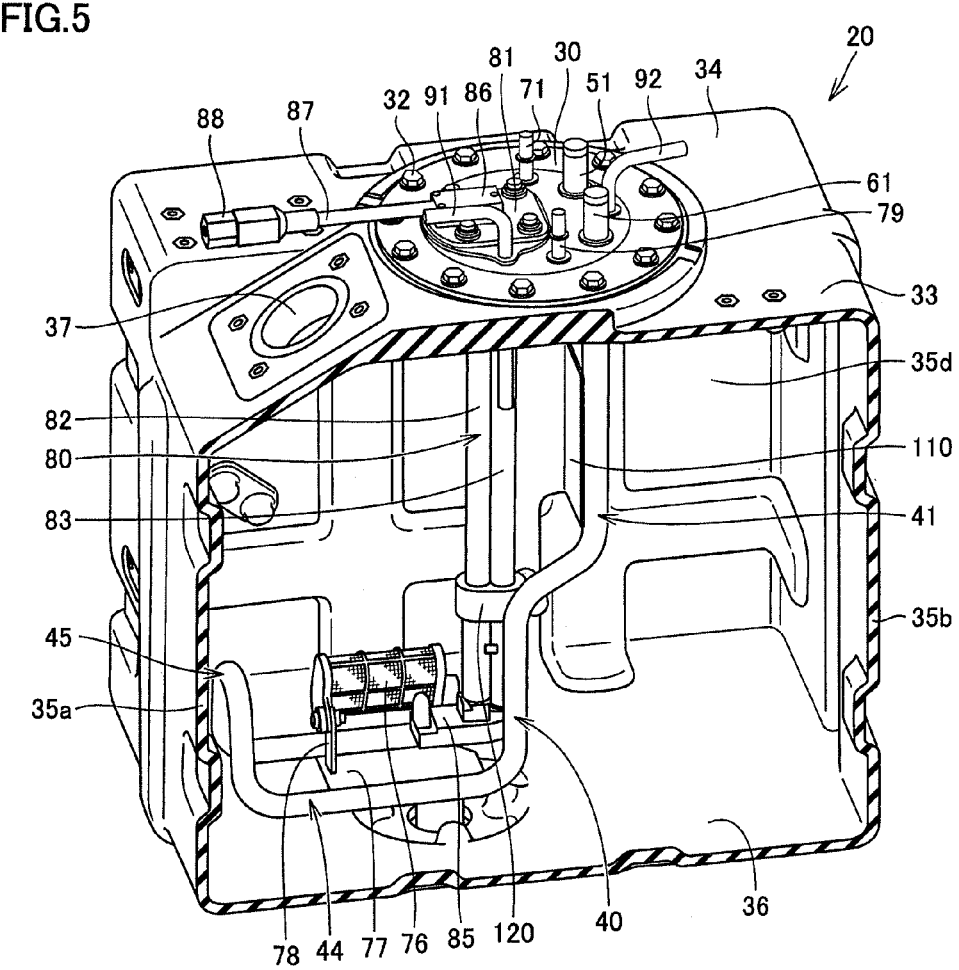
FIG. 5 is a partially-broken cross-sectional view representing a partially-broken reducing agent tank.

FIG. 5 is a partially-broken cross-sectional view representing a partially-broken reducing agent tank shown in FIG. 4. Referring to FIG. 5, container main body 33 has a side face 35b opposing side face 35a, a side face 35d opposing side face 35c shown in FIG. 4, and a bottom face 36 opposing upper face 34. Side face 35a and side face 35b are provided approximately in parallel. Side face 35c and side face 35d are provided approximately in parallel. Upper face 34 and bottom face 36 are provided approximately in parallel.

Figure 6:
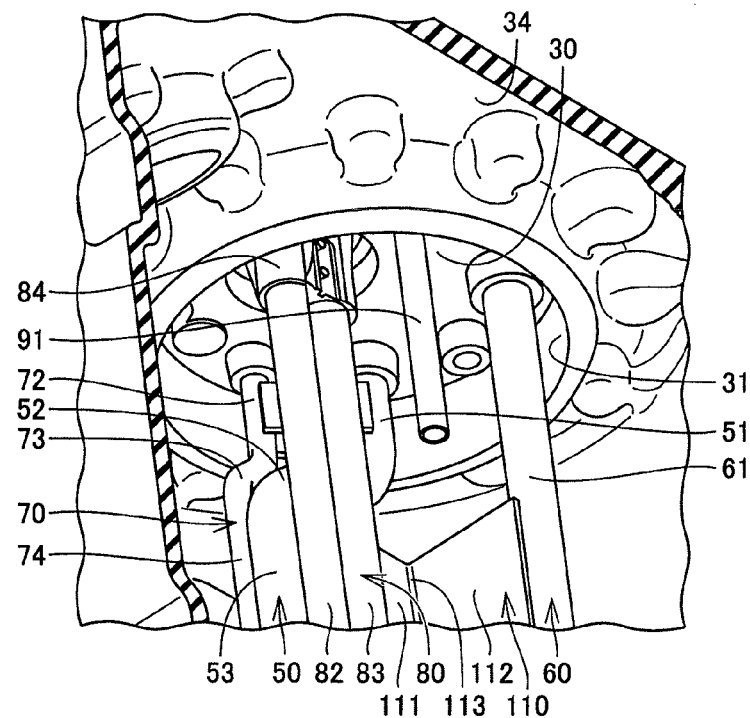
FIG. 6 is a perspective view representing an upper face of the reducing agent tank viewed from below.

FIG. 6 is a perspective view representing upper face 34 of reducing agent tank 20 viewed from below. Referring to FIG. 6, upper face 34 of container main body 33 of reducing agent tank 20 has an opening 31 penetrating through upper face 34. Opening 31 is formed to be circular. Top cover 30 described above covers opening 31 from above to close opening 31. The diameter of opening 31 is smaller than the diameter of top cover 30 closing opening 31. Penetrating portions 51, 61 fixed to top cover 30 penetrates through upper face 34 of container main body 33 and extends in a direction toward bottom face 36 from upper face 34 of container main body 33. Penetrating portions 51, 61 extend in the direction orthogonal to upper face 34 and bottom face 36. Penetrating portions 51, 61 extend in the direction orthogonal to disc-like top cover 30.

Figure 7:
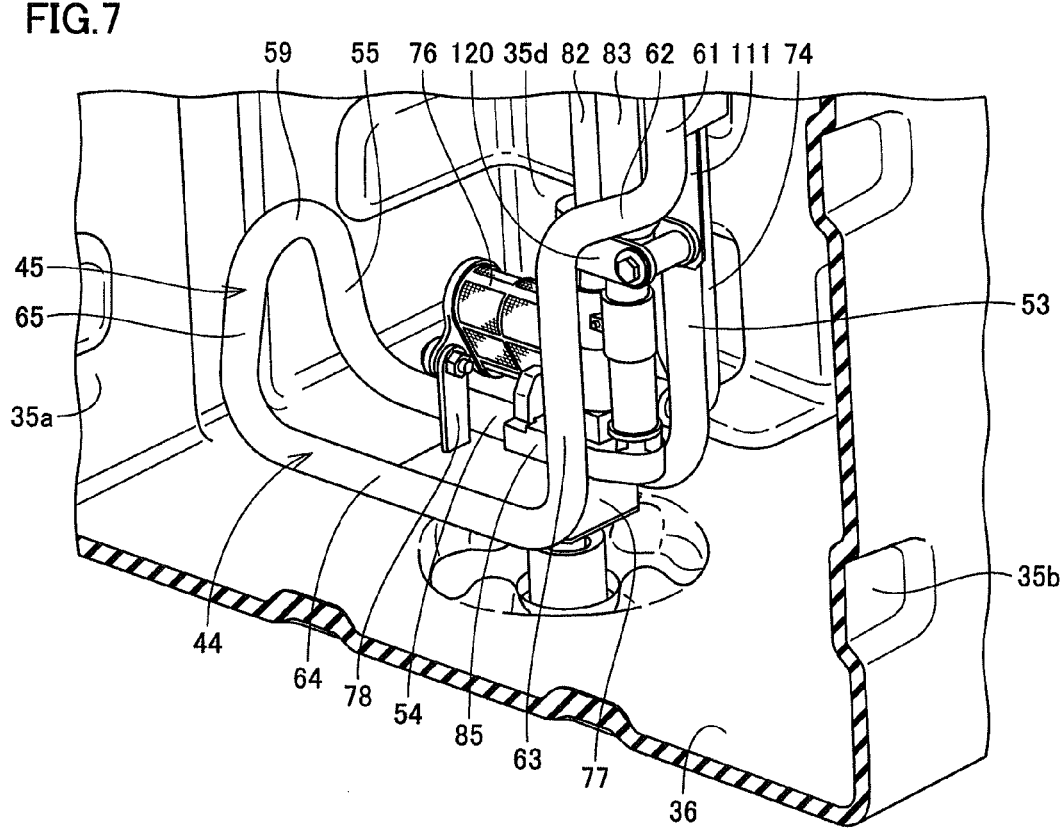
FIG. 7 is an enlarged perspective view representing a periphery of a leading end of the heat exchanger inside of the reducing agent tank.
Figure 8:
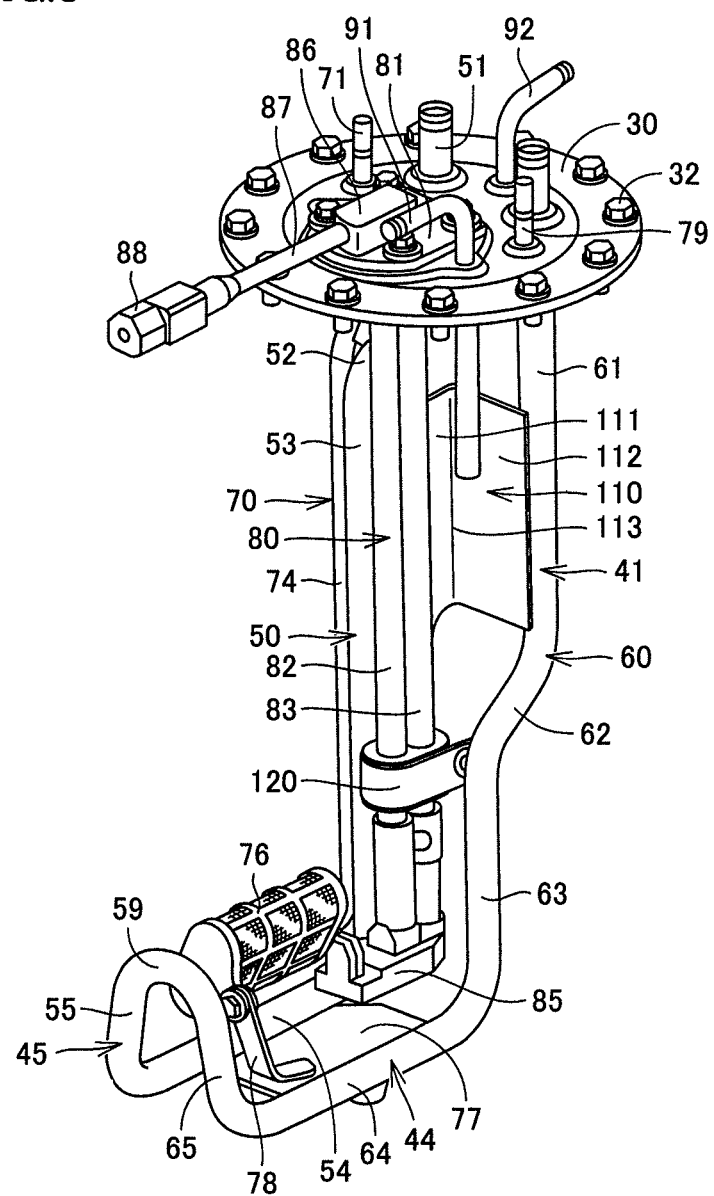
FIG. 8 is a perspective view representing an arrangement of the heat exchanger with a suction pipe and a sensor unit.

FIG. 7 is an enlarged perspective view representing a periphery of a leading end of heat exchanger 40 in reducing agent tank 20. FIG. 8 is a perspective view representing the arrangement of heat exchanger 40, suction pipe 70, and sensor unit 80. Referring to FIGS. 5 to 8 as needed, reducing agent tank 20, particularly the configuration arranged in container main body 33 will be described.

In container main body 33 of reducing agent tank 20, heat exchanger 40 is arranged through which a medium for heat exchange with the reducing agent flows. Details as to the structure of heat exchanger 40 will be described later.

In container main body 33, a suction pipe 70 (FIG. 6) is arranged which sucks out reducing agent 90 stored in container main body 33. Suction pipe 70 has outflow port 71 attached to top cover 30. Suction pipe 70 has an upper suspended portion 72, an inclined portion 73, and a lower suspended portion 74. Upper suspended portion 72 extends from top cover 30 so as to be suspended on the same straight line with outflow port 71. Inclined portion 73 is connected to a lower end of upper suspended portion 72, and extends on a side leaving apart from top cover 30 in inclination relative to upper suspended portion 72. Lower suspended portion 74 is connected to a lower end of inclined portion 73 and extends in parallel with upper suspended portion 72.

Upper suspended portion 72 and lower suspended portion 74 extend in parallel with side faces 35a to 35d of container main body 33 and extend perpendicularly to upper face 34 and bottom face 36 of container main body 33. Inclined portion 73 extends in a direction of inclining relative to upper face 34, side faces 35a to 35d, and bottom face 36 of container main body 33.

Further, suction pipe 70 has an extension portion 75 (refer to FIG. 12) and a strainer (filter) 76. Extension portion 75 is connected to a lower end of lower suspended portion 74, and extends toward side face 35a along bottom face 36 of container main body 33. Strainer 76 forms a leading end portion of suction pipe 70. The reducing agent stored in container main body 33 flows into suction pipe 70 via strainer 76. Strainer 76 is provided to filter out impurities in container main body 33 to prevent impurities from flowing into suction pipe 70. As shown in FIG. 5, strainer 76 is arranged close to bottom face 36 of container main body 33 so that the reducing agent can be sucked out through suction pipe 70 even when the amount of the reducing agent in container main body 33 becomes small.

A support plate 77 is placed on bottom face 36 of container main body 33. A plate-like support portion 78 protrudes from support plate 77 toward upper face 34 of container main body 33. In the vicinity of the leading end of plate-like support portion 78, strainer 76 is fixed to plate-like support portion 78 by a bolt. Strainer 76 is supported on bottom face 36 of container main body 33 through support plate 77 and plate-like support portion 78. Accordingly, the stiffness of suction pipe 70 is improved.

In container main body 33, a sensor unit 80 is arranged. Sensor unit 80 has a harness 82, a level sensor 83, and a concentration/temperature sensor 85. Harness 82 and level sensor 83 are attached to a lower face of top cover 30 by a holder 84. Harness 82 and level sensor 83 extend toward bottom face 36 of container main body 33 so as to be suspended from top cover 30. Concentration/temperature sensor 85 is attached at lower ends of harness 82 and level sensor 83.

Level sensor 83 has a float therein. The float is positioned on a liquid surface of the reducing agent. A level of the reducing agent in container main body 33 is detected based on height position information of the float. Concentration/temperature sensor 85 measures a concentration and a temperature of the reducing agent. A signal associated with measured values of the level, concentration, and temperature of the reducing agent is transmitted to base portion 86 shown in FIGS. 4 and 5 via harness 82 and outputted to a controller, which is not illustrated in the drawings, further via harness 87 and connector 88.

Sensor unit 80 is supported on a heat transfer plate 110 through a clamp portion 120. Accordingly, the stiffness of sensor unit 80 is improved. Details about heat transfer plate 110 will be described later.

Figure 9:
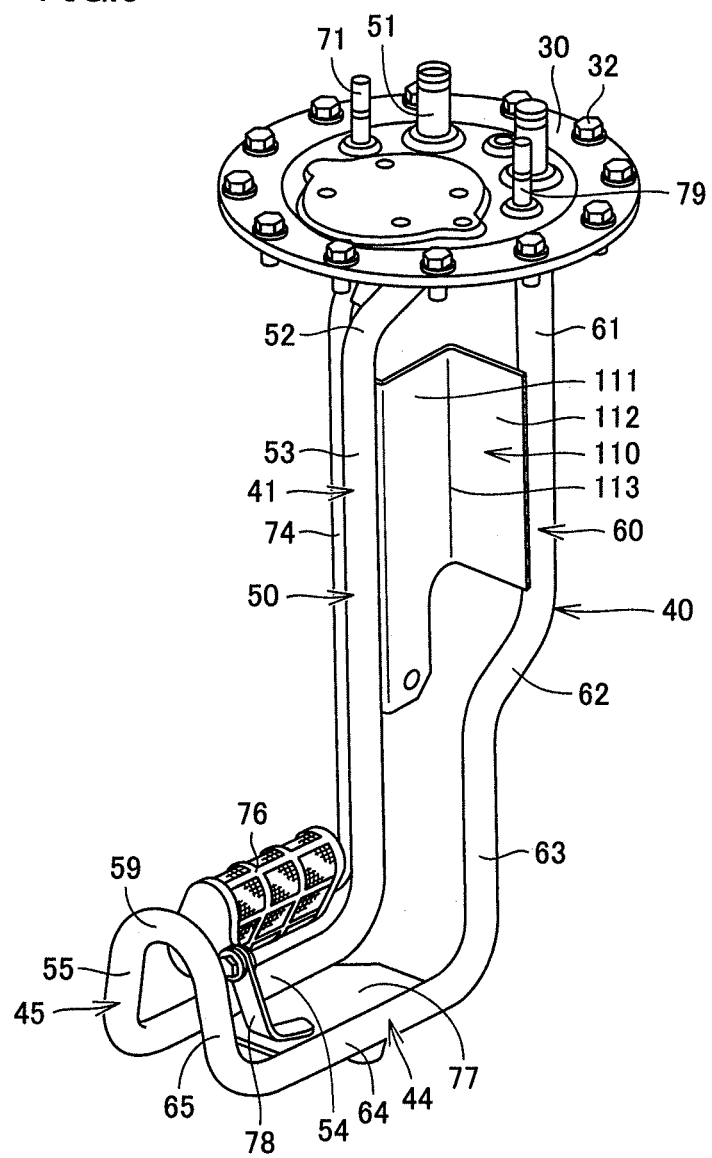
FIG. 9 is a perspective view representing the heat exchanger supported by the top cover.
Figure 10:
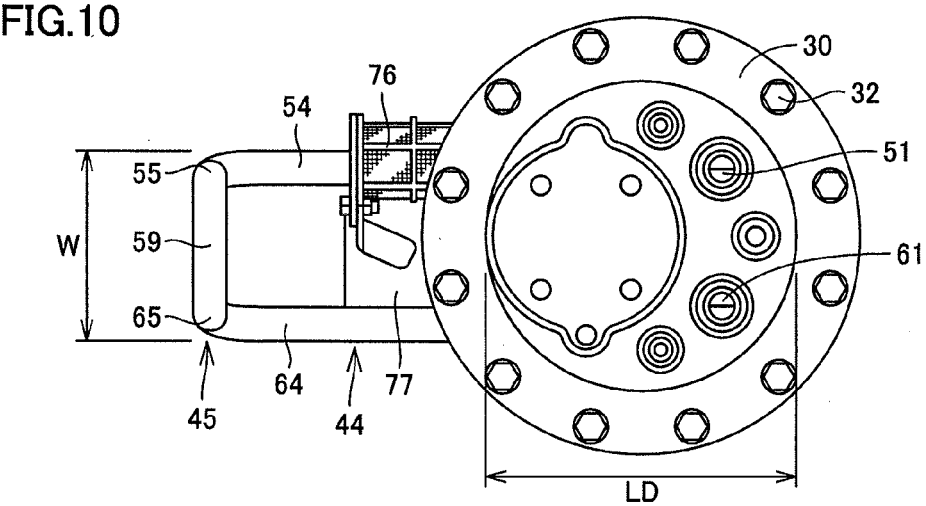
FIG. 10 is a plan view representing the top cover and the heat exchanger shown in FIG. 9.
Figure 11:
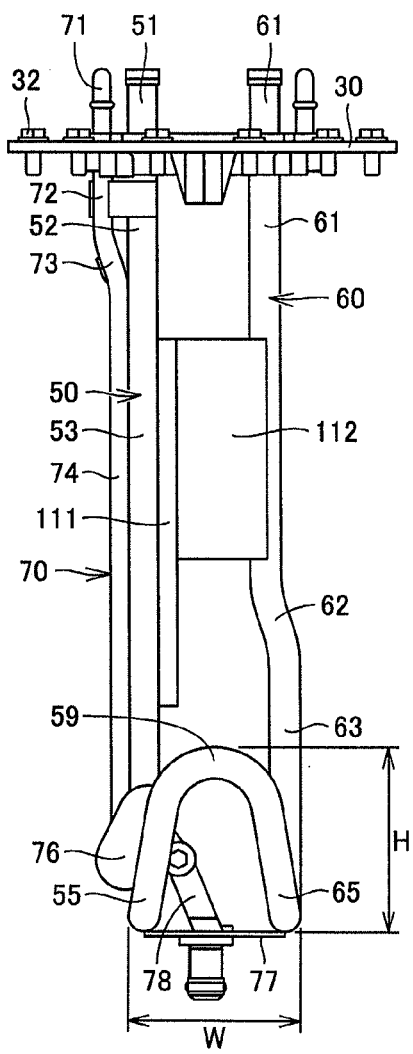
FIG. 11 is a side view representing the top cover and the heat exchanger shown in FIG. 9.
Figure 12:
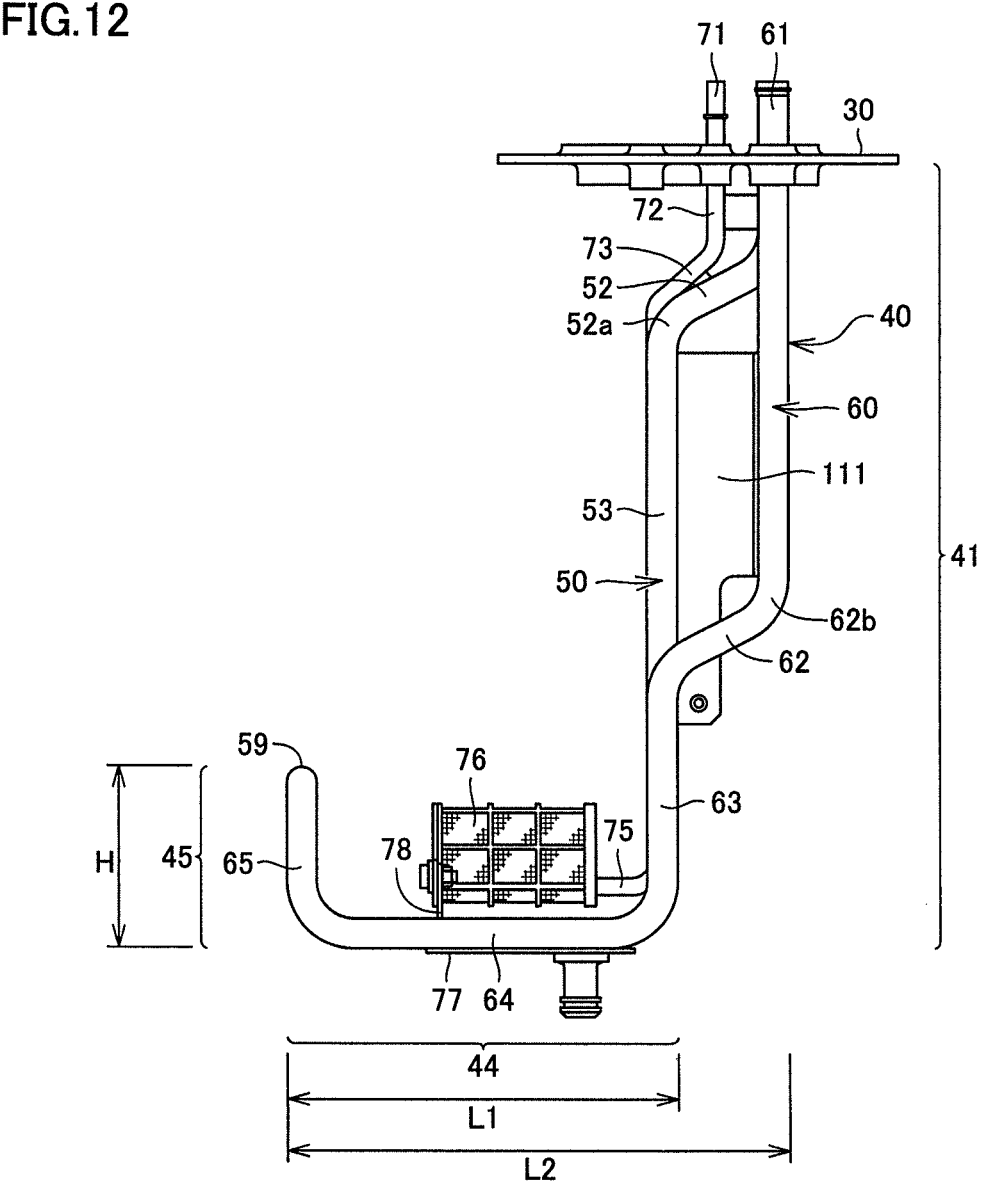
FIG. 12 is a front view representing the top cover and the heat exchanger shown in FIG. 9.

FIG. 9 is a perspective view representing heat exchanger 40 supported by top cover 30. FIG. 10 is a plan view representing top cover 30 and heat exchanger 40 shown in FIG. 9. FIG. 11 is a side view representing top cover 30 and heat exchanger 40 shown in FIG. 9. FIG. 12 is a front view representing top cover 30 and heat exchanger 40 shown in FIG. 9. Referring to FIGS. 9 to 12 and FIGS. 5 to 8 as needed, the structure of heat exchanger 40 which performs heat exchange with the reducing agent will be described.

Heat exchanger 40 has a suspended portion 41, a parallel portion 44, and a leading end bent portion 45. Suspended portion 41 is a portion of heat exchanger 40 extending from upper face 33 of container main body 33 toward bottom face 36. Parallel portion 44 is a portion of heat exchanger 40 which is joined to a lower end of suspended portion 41 and extends horizontally along bottom face 36 of container main body 33. Leading end bent portion 45 is joined to a leading end of parallel portion 44. Leading end bent portion 45 is bent relative to parallel portion 44 and extends upward along side face 35a of container main body 33. Leading end bent portion 45 forms a leading end portion of heat exchanger 40.

Suspended portion 41, parallel portion 44, and leading end bent portion 45 are formed integrally by bending an approximately U-shaped pipe member. Alternatively, heat exchanger 40 may be formed by joining pipe members respectively constituting suspended portion 41, parallel portion 44, and leading end bent portion 45 with welding, for example.

Viewing heat exchanger 40 from another point, heat exchanger 40 has a first pipeline 50 (FIG. 9) which guides the heat exchange medium into container main body 33, a second pipeline 60 which allows the heat exchange medium to flow out from container main body 33, and a turning portion 59. First pipeline 50 and second pipeline 60 communicate with each other through turning portion 59.

First pipeline 50 has a penetrating portion 51, an inclined portion 52, a lower suspended portion 53, an extension portion 54, and a rising portion 55. Penetrating portion 51 penetrates through upper face 34 of container main body 33 and extends into a space in container main body 33. Inclined portion 52 is connected to a lower end of penetrating portion 51. Inclined portion 52 is provided as a first inclined portion which inclines relative to penetrating portion 51 and extends toward the side of bottom face 36. Lower suspended portion 53 is connected to a lower end of inclined portion 52 and extends in parallel with penetrating portion 51.

Penetrating portion 51 and lower suspended portion 53 extend in parallel with side faces 35a to 35d of container main body 33 and extend perpendicularly to upper face 34 and bottom face 36 of container main body 33. Inclined portion 52 extends in a direction of inclining relative to upper face 34, side faces 35a to 35d, and bottom face 36 of container main body 33.

Extension portion 54 is joined to a lower end of lower suspended portion 53 and extends toward side face 35a of container main body 33 along bottom face 36 of container main body 33. Rising portion 55 is joined to a leading end of extension portion 54, and extends toward upper face 34 of container main body 33 along side face 35a of container main body 33.

Suspended portion 41 which extends from upper face 34 toward bottom face 36 of container main body 33 is configured to include penetrating portion 51, inclined portion 52, and lower suspended portion 53 of first pipeline 50. Two bent portions are formed in suspended portion 41 included in first pipeline 50, and this bent portion forms inclined portion 52. Parallel portion 44 is configured to include extension portion 54 of first pipeline 50. Leading end bent portion 45 is configured to include rising portion 55 of first pipeline 50.

Second pipeline 60 has penetrating portion 61, an inclined portion 62, a lower suspended portion 63, an extension portion 64, and a rising portion 65. Penetrating portion 61 penetrates through upper face 34 of container main body 33 and extends into a space in container main body 33. Inclined portion 62 is connected to a lower end of penetrating portion 61. Inclined portion 62 is provided as a second inclined portion which inclines relative to penetrating portion 61 and extends toward the side of bottom face 36. Lower suspended portion 63 is connected to a lower end of inclined portion 62 and extends in parallel with penetrating portion 61.

Penetrating portion 61 and lower suspended portion 63 extend in parallel with side faces 35a to 35d of container main body 33 and extend perpendicularly to upper face 34 and bottom face 36 of container main body 33. Inclined portion 62 extends in a direction of inclining relative to upper face 34, side faces 35a to 35d, and bottom face 36 of container main body 33.

Extension portion 64 is joined to a lower end of lower suspended portion 63 and extends toward side face 35a of container main body 33 along bottom face 36 of container main body 33. Rising portion 65 is joined to a leading end of extension portion 64, and extends toward upper face 34 of container main body 33 along side face 35a of container main body 33.

Suspended portion 41 which extends from upper face 34 toward bottom face 36 of container main body 33 is configured to include penetrating portion 61, inclined portion 62, and lower suspended portion 63 of second pipeline 60. Two bent portions are formed in suspended portion 41 included in second pipeline 60, and these bent portions form inclined portion 62. Parallel portion 44 is configured to include extension portion 64 of second pipeline 60. Leading end bent portion 45 is configured to include rising portion 65 of second pipeline 60.

Penetrating portions 51, 61 and lower suspended portions 53, 63 are arranged in parallel with each other. Extension portions 54, 64 are arranged in parallel with each other. Extension portions 54, 64 extend in a direction orthogonal to lower suspended portions 53, 63.

Leading end bent portion 45 is formed by rising portion 55 of first pipeline 50, rising portion 65 of second pipeline 60, and turning portion 59 allowing first pipeline 50 and second pipeline 60 to communicate with each other. Turning portion 59 is formed by a cross section of leading end bent portion 45 which is orthogonal to an extending direction of heat exchanger 40 at a point closest to upper face 34 of container main body 33 and which includes the closest point. Turning portion 59 is formed by a cross section of heat exchanger 40 which includes the point of leading end bent portion 45 closest to upper face 34 of container main body 33 and which is parallel to side faces 35c, 35d of container main body 33. Leading end bent portion 45 is formed to have an inverse U-shape.

In suspended portion 41, a distance between first pipeline 50 and second pipeline 60 is set to be approximately constant. In parallel portion 44, a distance between first pipeline 50 and second pipeline 60 is set to be approximately constant. In leading end bent portion 45, a distance between first pipeline 50 and second pipeline 60 becomes smaller as coming closer to turning portion 59. Herein, the distance between first pipeline 50 and second pipeline 60 represents a minimum distance between first pipeline 50 and second pipeline 60 in the direction orthogonal to the extending direction of first pipeline 50 or second pipeline 60.

As shown in FIG. 8, inclined portion 52 included in first pipeline 50 and inclined portion 62 included in second pipeline 60 are inclined relative to penetrating portions 51, 61 so as to come close to sensor unit 80 as leaving apart from penetrating portions 51, 61. Sensor unit 80 is arranged between lower suspended portion 53 of first pipeline 50 and lower suspended portion 63 of second pipeline 60. Heat exchanger 40 is arranged close to sensor unit 80 so that more efficient heat transfer is performed with respect to sensor unit 80 and the reducing agent in a periphery of sensor unit 80.

Inclined portion 73 (FIG. 6) of suction pipe 70 through which the reducing agent flows is inclined relative to upper suspended portion 72 so as to come close to first pipeline 50 as leaving apart from upper suspended portion 72. Lower suspended portion 74 of suction pipe 70 is arranged in parallel with lower suspended portion 53 of first pipeline 50 and extends along lower suspended portion 53 of first pipeline 50. A distance between lower suspended portion 53 of first pipeline 50 and lower suspended portion 74 of suction pipe 70 is minimized. For example, a distance between lower suspended portions 53, 74 may be smaller than or equal to an outer diameter of the pipe forming first pipeline 50. Heat exchanger 40 is arranged close to suction pipe 70 so that more efficient heat transfer is performed with respect to suction pipe 70 and the reducing agent in a periphery of suction pipe 70.

Strainer 76 provided at a leading end of suction pipe 70 is arranged so as to be covered at side portions in two directions with suspended portion 41 and leading end bent portion 45 of heat exchanger 40 and at a lower side with parallel portion 44. By arranging heat exchanger 40 in a periphery of strainer 76, heat transfer to the reducing agent in the vicinity of strainer 76 is performed preferentially, so that the reducing agent in the vicinity of strainer 76 can be thawed preferentially when the reducing agent is frozen.

Suspended portion 41 of heat exchanger 40 is attached to top cover 30 which closes opening 31 and suspended from top cover 30. When viewed from a thickness direction of top cover 30, suspended portion 41 is arranged inside of a circle forming opening 31. Inclined portions 52, 62 are inclined relative to penetrating portions 51, 61 in the region corresponding to a projection of opening 31 along the extending direction of penetrating portions 51, 61. Accordingly, suspended portion 41 can be taken out from container main body 33 via opening 31 by detaching top cover 30 from upper face 34 of container main body 33 and lifting top cover 30 in the direction orthogonal to upper face 34 (in the direction perpendicular to the sheet of FIG. 10).

A dimension LD shown in FIG. 10 and FIGS. 13, 17 to 20 described later represents a maximum inside length of opening 31 formed in upper face 34 of container main body 33 through a center CO of opening 31. Specifically, dimension LD represents a maximum length of a diameter length inside of opening 31 in all 360° views in the case where opening 31 is viewed from outside along the extending direction of upper face 34. Dimension LD represents a maximum length of an inside length of opening 31 passing through center CO. In the case where opening 31 is circular, dimension LD represents a diameter of the circle.

Dimension W shown in FIGS. 10 and 11 represents a width dimension of leading end bent portion 45. Specifically, dimension W represents an outer shape dimension of the planar shape of leading end bent portion 45 shown in FIG. 10 extending from extension portion 54 to extension portion 64. Dimension W represents a maximum value of a sum of an outer diameter of rising portion 55, an outer diameter of rising portion 65, and a distance between rising portions 55, 65 along the leftward and rightward directions in FIG. 11. Dimension W represents an outer shape dimension of leading end bent portion 45 along side face 35a and in the direction parallel with upper face 34 and bottom face 36 in the state where heat exchanger 40 is arranged in container main body 33.

As shown in FIG. 11, first pipeline 50 and second pipeline 60 extend from top cover 30 to turning portion 59 while maintaining a sum of an outer diameter of first pipeline 50, an outer diameter of second pipeline 60, and a distance between first pipeline 50 and second pipeline 60 to be smaller than dimension LD representing a diameter of circular opening 31. Dimension W representing a width dimension of leading end bent portion 45 is smaller than dimension LD representing a diameter of circular opening 31.

A dimension H shown in FIGS. 11 and 12 represents a rising height of leading end bent portion 45, in other words, an outer shape dimension of leading end bent portion 45 in the upward and downward directions of FIGS. 11 and 12 viewing leading end bent portion 45 from a side. Dimension H represents an outer shape dimension of leading end bent portion 45 along side face 35a and in the direction orthogonal to upper face 34 and bottom face 36 in the state where heat exchanger 40 is arranged in container main body 33.

Dimension L1 shown in FIG. 12 represents a length of parallel portion 44 or a length of extension portions 54, 64. Dimension L1 represents a maximum value of a sum of an outer diameter of lower suspended portions 53, 63 of first pipeline 50 and second pipeline 60, an outer diameter of rising portion 65, and a distance between lower suspended portions 53, 63 and rising portion 65 along leftward and rightward directions in FIG. 12. Dimension L1 represents an outer shape dimension of extension portions 54, 64 along bottom face 36 and in the direction parallel to side faces 35c, 35d (refer to FIGS. 4 and 5) in the state where heat exchanger 40 is arranged in container main body 33.

Dimension L2 shown in FIG. 12 represents a maximum value of a sum of an outer diameter of penetrating portions 51, 61 of first pipeline 50 and second pipeline 60, an outer diameter of rising portion 65, and a distance between penetrating portions 51, 61 and rising portion 65 along the leftward and rightward directions in FIG. 12.

As shown in FIG. 9, a heat transfer plate 110 is provided across both first pipeline 50 and second pipeline 60. Heat transfer plate 110 has a flat plate-shaped first flat plate portion 111 and a flat plate-shaped second flat plate portion 112. Heat transfer plate 110 has a bent portion 113 which connects first flat plate portion 111 with second flat plate portion 112. Heat transfer plate 110 is formed by bending one flat plate.

Heat transfer plate 110 is provided between inclined portion 52 of first pipeline 50 and inclined portion 62 of second pipeline 60 in the extending direction of penetrating portions 51, 61. First flat plate portion 111 is fixed at lower suspended portion 53 on a side more apart from upper face 34 of container main body 33 than inclined portion 52 for example by welding. Second flat plate portion 112 is fixed at penetrating portion 61 on a side closer to container main body 33 than inclined portion 62 for example by welding. Heat transfer plate 110 is fixed at both of first pipeline 50 and second pipeline 60.

At a lower end portion of first flat plate portion 111, a clamp portion 120 (FIG. 8) is attached. Clamp portion 120 surrounds a periphery of harness 82 and level sensor 83 of sensor unit 80 to support sensor unit 80. Heat exchanger 40, heat transfer plate 110, and sensor unit 80 form a three-dimensional support structure. Accordingly, the stiffness of heat exchanger 40 and sensor unit 80 is improved.

Figure 13:
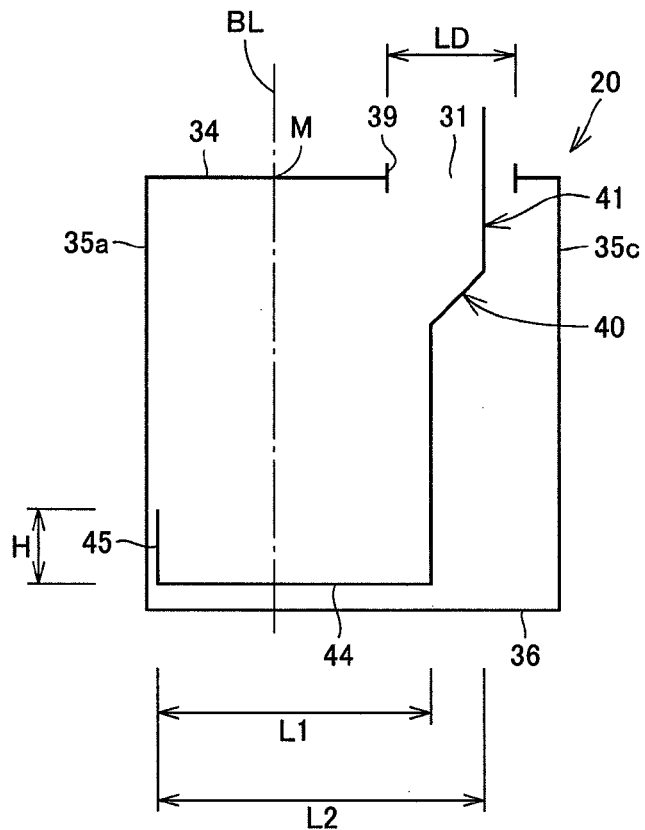
FIG. 13 schematically represents an arrangement of the heat exchanger in the container main body.

FIG. 13 schematically represents the arrangement of heat exchanger 40 in container main body 33. FIG. 13 represents a line diagram of a cross section of container main body 33 along side faces 35b, 35d and heat exchanger 40 arranged in container main body 33. FIG. 13 also illustrates a dimension LD representing a maximum inside length of opening 31, a dimension H representing a rising height of leading end bent portion 45 along side face 35a, a dimension L1 representing a length of extension portions 54, 64 along bottom face 36, and a dimension L2 representing a maximum distance from suspended portion 41 to leading end bent portion 45 along bottom face 36.

In FIG. 13, a portion of an edge of a whole circumference of opening 31 providing a minimum distance with respect to side face 35a is represented as an edge 39. A middle point M shown in FIG. 13 represents a middle point of a line segment along upper face 34 of container main body 33 between edge 39 of opening 31 and side face 35a of container main body 33. A dot and dash line BL shown in FIG. 13 is a perpendicular bisector line which passes through middle point M bisecting the distance between edge 39 of opening 31 and side face 35a of container main body 33 and extends in the direction orthogonal to upper face 34.

Referring to FIG. 13, dimension L1 representing a length of parallel portion 44 constituted of extension portions 54, 64 along bottom face 36 is larger than dimension LD representing a maximum inside length of opening 31. Dimension H representing a rising length of leading end bent portion 45 along side face 35a is smaller than dimension LD representing the maximum inside length of opening 31.

Parallel portion 44 constituted of extension portions 54, 64 extends from suspended portion 41 toward side face 35a of container main body 33. Heat exchanger 40 comes closest to side face 35a at leading end bent portion 45. Leading end bent portion 45 is arranged closer to side face 35a than bisector line BL. A distance between leading end bent portion 45 and side face 35a is shorter than a length obtained by bisecting the minimum distance between edge 39 of opening 31 and side face 35a.

Penetrating portions 51, 61 of heat exchanger 40 are arranged so as to penetrate through opening 31. Penetrating portions 51, 61 are arranged at positions on a side leaving apart from side face 35a relative to a center of opening 31. Penetrating portions 51, 61 are arranged positions opposite to the extending direction of extension portions 54, 64 from suspended portion 41 relative to the center of opening 31.

Figure 14:
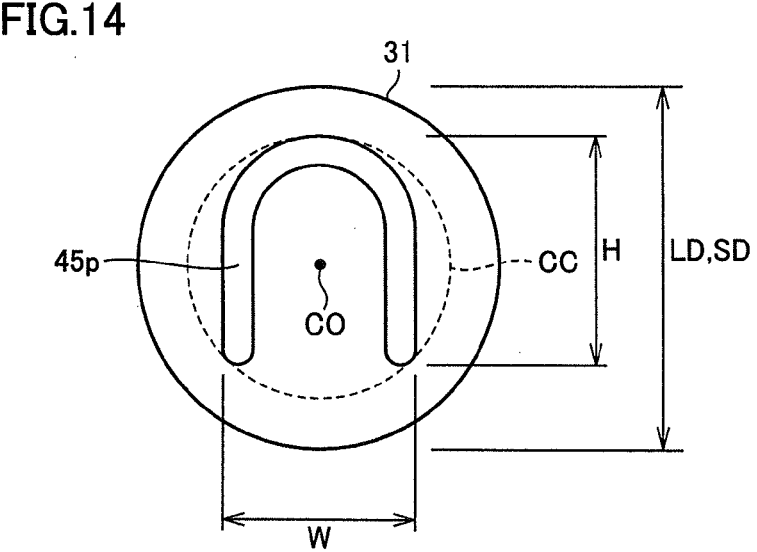
FIG. 14 schematically represents a first example of a relationship between a projection of a leading end bent portion and an opening.

FIG. 14 schematically represents a first example of a relationship between a projection 45p of leading end bent portion 45 and opening 31. FIG. 14 shows a dimensional relationship between projection 45p representing an image of leading end bent portion 45 projected to side face 35a and a shape in a planar view of opening 31 formed in upper face 34 of container main body 33. Projection 45p corresponds to a shape of leading end bent portion 45 viewed from the extending direction of extension portions 54, 64. A circumscribed circle CC illustrated with a broken line in FIG. 14 represents a circumscribed circle of projection 45p of leading end bent portion 45.

As shown in FIG. 14, the shape of leading end bent portion 45 viewed from the extending direction of extension portion 54, 64 is included in the planar shape of opening 31. Circumscribed circle CC of the shape of leading end bent portion 45 viewed from the extending direction of extension portion 54, 64 is included in the planar shape of opening 31. Dimension LD representing the maximum inside length passing through center CO of opening 31 represents a diameter of circular opening 31. In the case where opening 31 is circular, the diameter of circular opening 31 can be also expressed as a minimum inside length (dimension SD) passing through center CO of opening 31. Both dimension H representing a rising length of leading end bent portion 45 and dimension W representing a width of leading end bent portion 45 are smaller than dimension SD.

Figure 15:
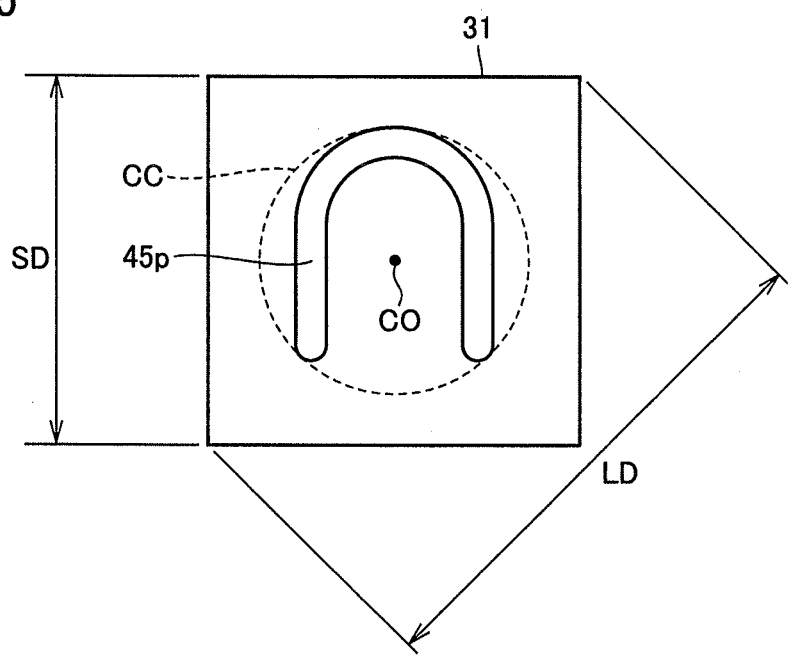
FIG. 15 schematically represents a second example of a relationship between a projection of a leading end bent portion and an opening.

FIG. 15 schematically represents a second example of a relationship between the projection of leading end bent portion 45 and the opening. Opening 31 formed to penetrate through upper face 34 of container main body 33 is not limited to have a circular shape, but may have any other shape such as a polygon or the like. FIG. 15 represents an example in which the planar shape of opening 31 is a square. Also in the second example shown in FIG. 15, projection 45p representing the shape of leading end bent portion 45 viewed from the extending direction of extension portions 54, 64 is included in the planar shape of opening 31. Circumscribed circle CC of the shape of leading end bent portion 45 viewed from the extending direction of extension portions 54, 64 is included in the planar shape of opening 31.

In the case where opening 31 is a square, dimension LD representing the maximum inside length of opening 31 represents a length of a diagonal line of the square. Dimension SD shown in FIG. 15 represents a distance between two opposite sides of the square. Dimension SD corresponds to a length of one side of square opening 31. Dimension SD is a minimum inside length passing through center CO of square opening 31. Dimension SD is smaller than dimension LD. Both dimension H representing a rising length of leading end bent portion 45 and dimension W (refer to FIG. 14) representing a width of leading end bent portion 45 are smaller than dimension SD shown in FIG. 15.

Figure 16:
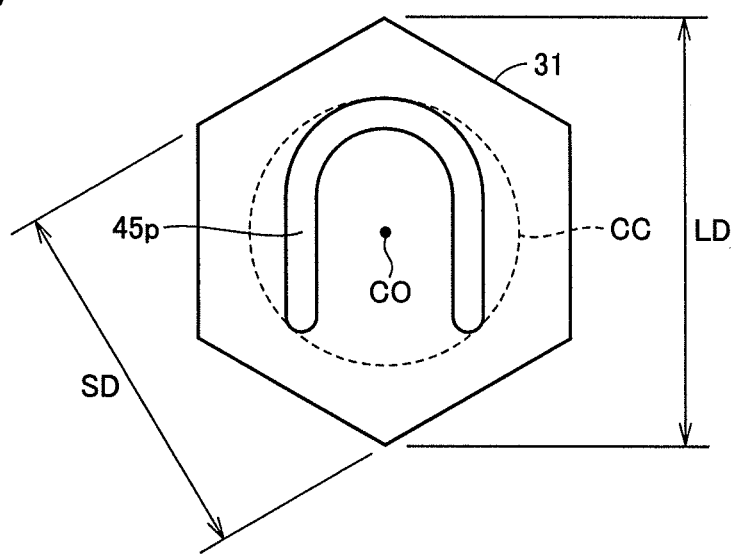
FIG. 16 schematically represents a third example of a relationship between a projection of a leading end bent portion and an opening.

FIG. 16 schematically represents a third example of the relationship between projection 45p of leading end bent portion 45 and opening 31. FIG. 16 represents an example in which the planar shape of opening 31 is a regular hexagon. Also in the third example shown in FIG. 16, projection 45p representing the shape of leading end bent portion 45 viewed from the extending direction of extension portion 54, 64 is included in the planar shape of opening 31. Circumscribed circle CC of the shape of leading end bent portion 45 viewed from the extending direction of extension portion 54, 64 is included in the planar shape of opening 31.

In the case where opening 31 is a regular hexagon, dimension LD representing the maximum inside length of opening 31 represents a length of a diagonal line having a maximum length among diagonal lines of the hexagon. Dimension SD shown in FIG. 16 represents a distance between two opposite sides of opening 31 which is a regular hexagon. Dimension SD is a minimum inside length passing through center CO of regular hexagonal opening 31. Dimension SD is smaller than dimension LD. Both dimension H representing a rising length of leading end bent portion 45 and dimension W (refer to FIG. 14) representing a width of leading end bent portion 45 are smaller than dimension SD shown in FIG. 16.

FIGS. 17 to 20 are perspective views representing each step of drawing out heat exchanger 40 from container main body 33. Heat exchanger 40 attached to top cover 30 is formed to be detachable from container main body 33 integrally with top cover 30.

Figure 17:
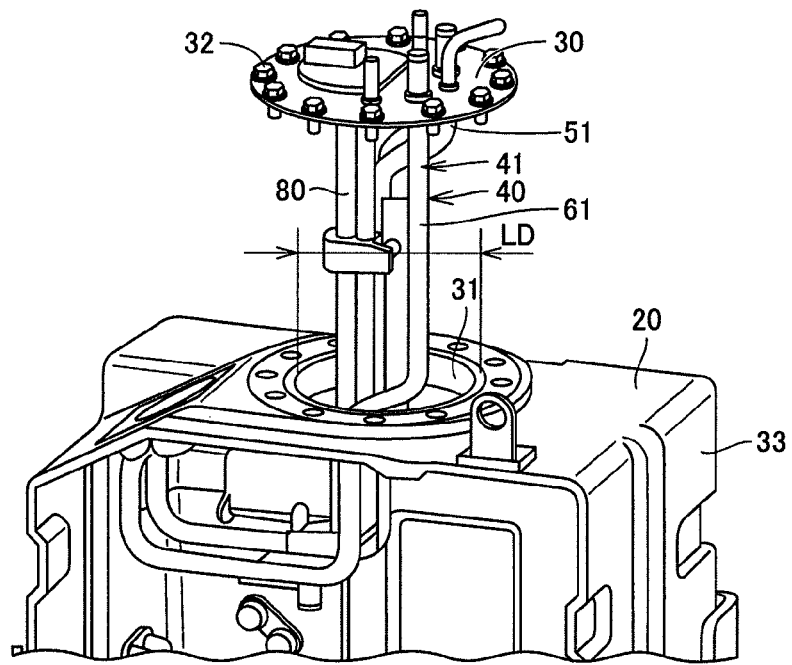
FIG. 17 is a perspective view representing a first step of drawing out the heat exchanger from the container main body.

Specifically, suspended portion 41 of heat exchanger 40 is formed so as to be settled in a region corresponding to a projection of opening 31 along the extending direction of penetrating portions 51, 61. Therefore, when all of bolts 32 fixing top cover 30 to container main body 33 are detached, and top cover 30 is lifted upward, suspended portion 41 of heat exchanger 40 is movable to outside of container main body 33 via opening 31 as shown in FIG. 17.

Figure 18:
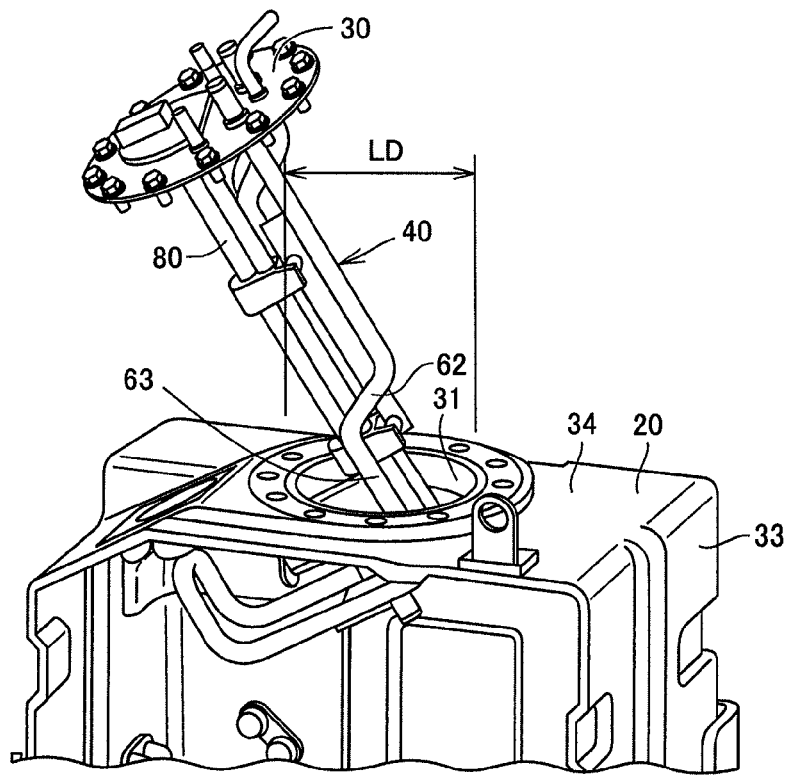
FIG. 18 is a perspective view representing a second step of drawing out the heat exchanger from the container main body.

As shown in FIG. 18, after top cover 30 and heat exchanger 40 are lifted toward the direction of leaving apart from upper face 34 until inclined portion 62 of second pipeline 60 is drawn out of opening 31, top cover 30 and heat exchanger 40 are tilted. Top cover 30 and heat exchanger 40 are tilted relative to upper face 34 of container main body 33 so that heat exchanger 40 having an inverse L-shape shown in FIGS. 12 and 13 are rotated in the counter-clockwise direction.

Figure 19:
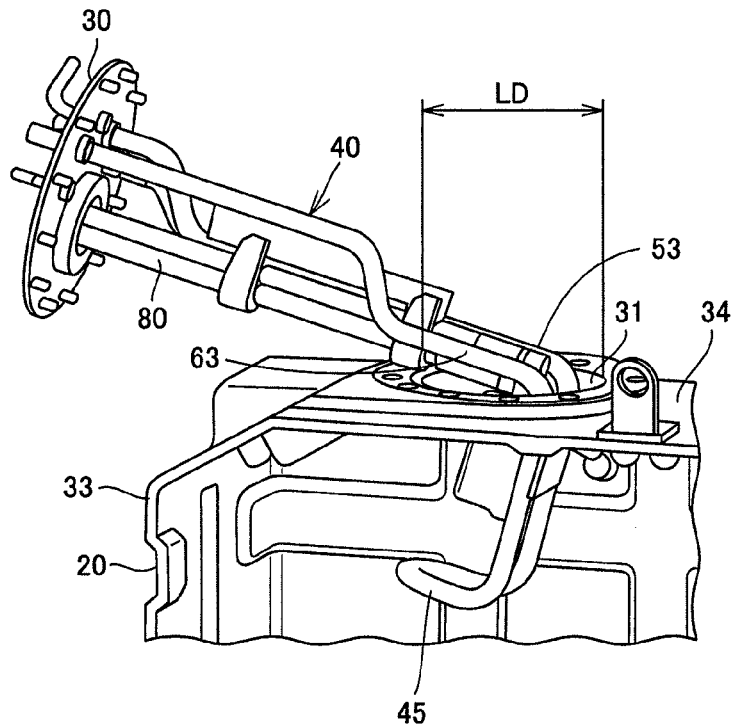
FIG. 19 is a perspective view representing a third step of drawing out the heat exchanger from the container main body.

As heat exchanger 40 is tilted continuously, an angle formed between lower suspended portions 53, 63 of heat exchanger 40 and upper face 34 of container main body 33 becomes smaller. As shown in FIG. 19, lower suspended portions 53, 63 are brought to upper face 34 as close as possible to an extent that lower suspended portions 53, 63 exposed to outside of container main body 33 do not come in contact with upper face 34 of container main body 33. Accordingly, leading end bent portion 45 of heat exchanger 40 is moved to a position of facing opening 31.

Figure 20:
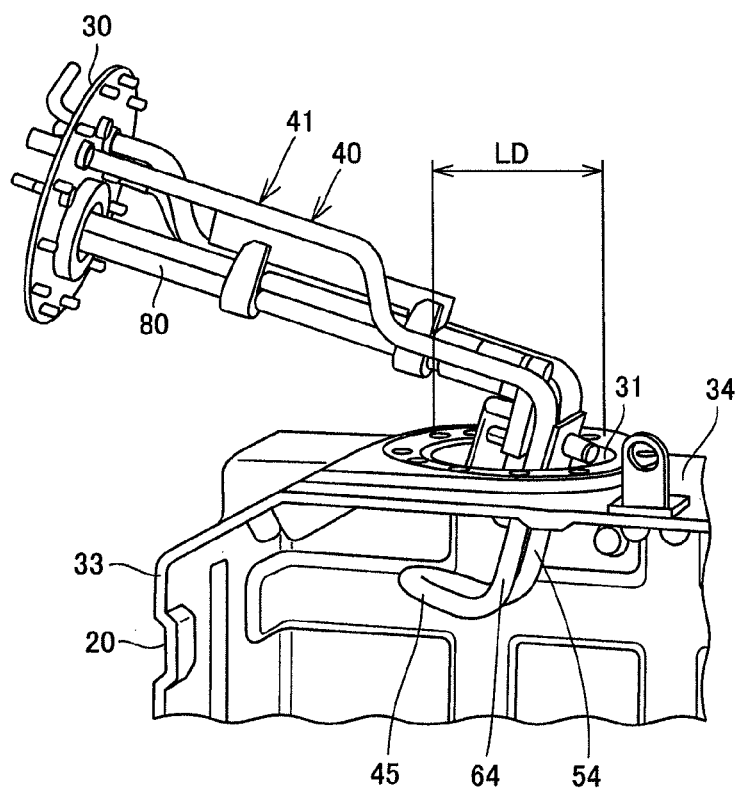
FIG. 20 is a perspective view representing a fourth step of drawing out the heat exchanger from the container main body.

Thereafter, as shown in FIG. 20, top cover 30 and heat exchanger 40 are moved along the extending direction of extension portions 54, 64 in the direction that suspended portion 41 leaves apart from upper face 34 of container main body 33. Leading end bent portion 45 has a rising length shorter than the maximum inside length of opening 31 and has projection 45p (FIG. 14) with a shape included in the planar shape of opening 31. Therefore, when heat exchanger 40 is moved to be lifted up along the extending direction of extension portions 54, 64, leading end bent portion 45 can be moved to outside of container main body 33 through opening 31. In such a manner, top cover 30 and heat exchanger 40 are taken out integrally from container main body 33.

Next, the effect of the present embodiment will be described.

According to reducing agent tank 20 of the present embodiment, as shown in FIGS. 5 and 9, first pipeline 50 and second pipeline 60 constituting heat exchanger 40 respectively have penetrating portions 51, 61, inclined portions 52, 62, and lower suspended portions 53, 63 included in suspended portion 41 extending from top cover 30 toward bottom face 36 of container main body 33. Further, first pipeline 50 and second pipeline 60 respectively have extension portions 54, 64 extending from the lower end of suspended portion 41 along bottom face 36 toward side face 35a of container main body 33, and rising portions 55, 65 extending from the leading end of extension portions 54, 64 along side face 35a toward upper face 34 of container main body 33. Dimension L1 representing a length of extension portions 54, 64 along bottom face 36 is larger than dimension LD representing a maximum inside length of opening 31.

Cooling water heated in engine 10 circulates into heat exchanger 40. The cooling water flowing in heat exchanger 40 is higher in temperature than the reducing agent stored in container main body 33. Therefore, heat radiation from heat exchanger 40 to the reducing agent is performed. Viewing from the thickness direction of upper face 34 of container main body 33, when extension portions 54, 64 are set so as to extend to a position beyond opening 31, a long path length of heat exchanger 40 in reducing agent tank 20 can be secured by increasing the length of extension portion 54, 64, so that a surface area of heat exchanger 40 is increased. A heat transfer area from heat exchanger 40 to the reducing agent can be increased, so that the heat transfer efficiency from the cooling water flowing in heat exchanger 40 to the reducing agent can be improved.

Further, as shown in FIGS. 9 and 11, rising portion 55 of first pipeline 50, rising portion 65 of second pipeline 60, and turning portion 59 form leading end bent portion 45 of heat exchanger 40. As shown in FIG. 13, dimension H representing a rising length of leading end bent portion 45 along side face 35a of container main body 33 is smaller than dimension SD representing a minimum inside length passing through the center of opening 31.

In such a manner, heat exchanger 40 can move from inside to outside of container main body 33 via opening 31. Thus, top cover 30 and heat exchanger 40 can be taken out integrally from container main body 33, so that heat exchanger 40 can be drawn out from container main body 33 at the time of maintenance and the like.

Further, as shown in FIGS. 14 to 16, the shape of leading end bent portion 45 viewed from the extending direction of extension portion 54, 64 is included in the planar shape of opening 31. In such a manner, leading end bent portion 45 can pass through opening 31 more readily, so that heat exchanger 40 can be drawn out from container main body 33 more readily. When the shape of circumscribed circle CC of the shape of leading end bent portion 45 viewed from the extending direction of extension portion 54, 64 is included in the planar shape of opening 31, leading end bent portion 45 can pass through opening 31 more readily, so that heat exchanger 40 can be drawn out from container main body 33 more readily, thus it is preferable.

Further, as shown in FIG. 13, a distance between leading end bent portion 45 and side face 35a of container main body 33 is smaller than a length obtained by bisecting a minimum distance between edge 39 of opening 31 and side face 35a. In such a manner, an extension length of extension portions 54, 64 of heat exchanger 40 along bottom face 36 can be set longer, so that a path length of heat exchanger 40 in reducing agent tank 20 becomes longer, thus a heat transfer area from heat exchanger 40 to the reducing agent can be increased. Accordingly, the heat transfer efficiency from the cooling water flowing in heat exchanger 40 to the reducing agent can be improved more.

Further, as shown in FIGS. 6 and 14, opening 31 is circular. In such a manner, sealing between upper face 34 of container main body 33 and top cover 30 covering opening 31 can be improved, and formation of a gap between upper face 34 and top cover 30 can be suppressed, so that a leakage of the reducing agent stored in container main body 33 can be prevented more securely.

Further, as shown in FIG. 11, first pipeline 50 and second pipeline 60 extend from top cover 30 to turning portion 59 allowing communication between first pipeline 50 and second pipeline 60 while maintaining a sum of an outer diameter of first pipeline 50, an outer diameter of second pipeline 60, and a distance between first pipeline 50 and second pipeline 60 to be smaller than dimension SD representing a minimum inside length passing through a center of opening 31. In such a manner, an entirety of heat exchanger 40 from top cover 30 to turning portion 59 can be moved from inside to outside of container main body 33 via opening 31, so that heat exchanger 40 can be drawn out from container main body 33 more readily.

As shown in FIGS. 9 and 11, reducing agent tank 20 includes suction pipe 70 which sucks out the reducing agent stored in container main body 33. Suction pipe 70 has a portion which extends along first pipeline 50. In such a manner, the reducing agent which flows in suction pipe 70 can be heated efficiently, so that freezing of the reducing agent in suction pipe 70 can be suppressed more securely. Inclined portion 52 is arranged closer to upper face 34 of container main body 33 than inclined portion 62, so that suction pipe 70 can extend along first pipeline 50 in a long distance. Therefore, reducing agent tank 20 which is advantageous in thawing of suction pipe 70 and prevention of freezing in suction pipe 70 can be achieved.

As shown in FIGS. 5 and 8, reducing agent tank 20 includes sensor unit 80 which extends from upper face 34 toward bottom face 36 of container main body 33. Inclined portions 52, 62 come closer to sensor unit 80 as leaving apart from penetrating portions 51, 61. Both heat exchanger 40 and sensor unit 80 are attached to top cover 30, and arranged with a space at the position of top cover 30. When heat exchanger 40 is bent in container main body 33 so as to allow inclined portions 52, 62 to come close to sensor unit 80, suspended portions 53, 63 below inclined portions 52, 62 are arranged to extend along sensor unit 80. Accordingly, heat can be transferred efficiently to sensor unit 80 and the reducing agent in the periphery of sensor unit 80, so that a failure of deteriorating the detection accuracy caused by freezing of the reducing agent can be avoided. Thus, the detection accuracy of the state of the reducing agent by sensor unit 80 can be improved.

Referring to FIGS. 2 and 3, hydraulic excavator 1 as a work vehicle of the present embodiment includes engine 10, exhaust gas treatment device 14 which performs treatment to the exhaust gas from engine 10 by means of a reductive reaction, reducing agent tank 20 described above, and injection nozzle 28 which injects the reducing agent sucked out from reducing agent tank 20 to the exhaust gas guided to exhaust gas treatment device 14. Accordingly, hydraulic excavator 1 including reducing agent tank 20 enabling detachment of top cover 30 and heat exchanger 40 while maintaining a long path length of heat exchanger 40 in reducing agent tank 20 can be provided.

It should be understood that the embodiment disclosed herein is illustrative and non-restrictive in every respect. The scope of the present invention is defined by the terms of claims, rather than the description of the embodiments set forth above, and is intended to include any modifications within the scope and meaning equivalent to the terms of the claims.

REFERENCE SIGNS LIST 1 hydraulic excavator; 4 work implement; 6 engine compartment; 10 engine; 11 exhaust pipe; 12, 14 exhaust gas treatment device; 13 intermediate connection pipe; 15 exhaust stack; 20 reducing agent tank; 21 feed pipe; 22 reducing agent pump; 23 return pipe; 25 pressure feed pipe; 28 injection nozzle; 30 top cover; 31 opening; 32 bolt; 33 container main body; 34 upper face; 35a-35d side face; 36 bottom face; 39 edge; 40 heat exchanger; 41 suspended portion; 44 parallel portion; 45 leading end bent portion; 45p projection; 50 first pipeline; 51, 61 penetrating portion; 52, 62, 73 inclined portion; 53, 63, 74 lower suspended portion; 54, 64, 75 extension portion; 55, 65 rising portion; 59 turning portion; 60 second pipeline; 70 suction pipe; 71 flow-out port; 72 upper suspended portion; 76 strainer; 79 return port; 80 sensor unit; 82, 87 harness; 83 level sensor; 85 concentration/temperature sensor; 90 reducing agent; LD, SD, H, L1 dimension; CC circumscribed circle.

The invention claimed is:

1. A reducing agent tank, comprising:
    a container main body which has an opening formed in an upper face and stores a reducing agent;
    a heat exchanger which performs heat exchange with said reducing agent; and
    a top cover which covers said opening and supports said heat exchanger,
    said heat exchanger including a first pipeline which guides a heat exchange medium into said container main body, a second pipeline which allows a heat exchange medium to flow out from said container main body, and a turning portion, said first pipeline and said second pipeline communicating with each other through said turning portion,
    each of said first pipeline and said second pipeline having a suspended portion which extends from said top cover toward a bottom face of said container main body, an extension portion which extends from a lower end of said suspended portion along said bottom face toward a side face of said container main body, and a rising portion which extends from a leading end of said extension portion along said side face toward said upper face of said container main body,
    a length of each said extension portion along said bottom face being larger than a maximum inside length passing through a center of said opening,
    said rising portion of said first pipeline, said rising portion of said second pipeline, and said turning portion forming a leading end bent portion of said heat exchanger,
    a rising length of said leading end bent portion along said side face being smaller than a minimum inside length passing through a center of said opening.

2. The reducing agent tank according to claim 1, wherein a shape of said leading end bent portion viewed from an extending direction of said extension portion is included in a planar shape of said opening.

3. The reducing agent tank according to claim 2, wherein a circumscribed circle of a shape of said leading end bent portion viewed from an extending direction of said extension portion is included in a planar shape of said opening.

4. The reducing agent tank according to claim 1, wherein a distance between said leading end bent portion and said side face is smaller than a length obtained by bisecting a minimum distance between an edge of said opening and said side face.

5. The reducing agent tank according to claim 1, wherein said opening is circular.

6. The reducing agent tank according to claim 1, wherein said first pipeline and said second pipeline extend from said top cover to said turning portion while maintaining a sum of an outer diameter of said first pipeline, an outer diameter of said second pipeline, and a distance between said first pipeline and said second pipeline to be smaller than a minimum inside length passing through a center of said opening.

7. A work vehicle, comprising:
    an engine;
    an exhaust gas treatment device which performs treatment with a reductive reaction to an exhaust gas from said engine;
    the reducing agent tank according to claim 1; and
    a reducing agent injection device which injects said reducing agent sucked out from said reducing agent tank to said exhaust gas guided to said exhaust gas treatment device.

8. The reducing agent tank according to claim 2, wherein a distance between said leading end bent portion and said side face is smaller than a length obtained by bisecting a minimum distance between an edge of said opening and said side face.

9. The reducing agent tank according to claim 3, wherein a distance between said leading end bent portion and said side face is smaller than a length obtained by bisecting a minimum distance between an edge of said opening and said side face.

10. The reducing agent tank according to claim 2, wherein said opening is circular.

11. The reducing agent tank according to claim 3, wherein said opening is circular.

12. The reducing agent tank according to claim 4, wherein said opening is circular.

13. The reducing agent tank according to claim 2, wherein said first pipeline and said second pipeline extend from said top cover to said turning portion while maintaining a sum of an outer diameter of said first pipeline, an outer diameter of said second pipeline, and a distance between said first pipeline and said second pipeline to be smaller than a minimum inside length passing through a center of said opening.

14. The reducing agent tank according to claim 3, wherein said first pipeline and said second pipeline extend from said top cover to said turning portion while maintaining a sum of an outer diameter of said first pipeline, an outer diameter of said second pipeline, and a distance between said first pipeline and said second pipeline to be smaller than a minimum inside length passing through a center of said opening.

15. The reducing agent tank according to claim 4, wherein said first pipeline and said second pipeline extend from said top cover to said turning portion while maintaining a sum of an outer diameter of said first pipeline, an outer diameter of said second pipeline, and a distance between said first pipeline and said second pipeline to be smaller than a minimum inside length passing through a center of said opening.

16. The reducing agent tank according to claim 5, wherein said first pipeline and said second pipeline extend from said top cover to said turning portion while maintaining a sum of an outer diameter of said first pipeline, an outer diameter of said second pipeline, and a distance between said first pipeline and said second pipeline to be smaller than a minimum inside length passing through a center of said opening.

* * * * *